(12) United States Patent
Anderson et al.

(10) Patent No.: US 7,630,646 B2
(45) Date of Patent: *Dec. 8, 2009

(54) LOW POWER PORTABLE COMMUNICATION SYSTEM WITH WIRELESS RECEIVER AND METHODS REGARDING SAME

(75) Inventors: Marlyn J. Anderson, St. Louis Park, MN (US); Barry Voroba, Minnetonka, MN (US); Mark E. Haggerty, New Hope, MN (US)

(73) Assignee: Great American Technologies, Inc., Newark, NJ (US)

( * ) Notice: Subject to any disclaimer, the term of this patent is extended or adjusted under 35 U.S.C. 154(b) by 1085 days.

This patent is subject to a terminal disclaimer.

(21) Appl. No.: 09/826,394

(22) Filed: Apr. 3, 2001

(65) Prior Publication Data
US 2002/0030871 A1 Mar. 14, 2002

Related U.S. Application Data

(63) Continuation-in-part of application No. 09/542,708, filed on Apr. 4, 2000, now Pat. No. 7,095,981.

(51) Int. Cl.
*H04B 10/00* (2006.01)
*H04B 10/12* (2006.01)
*H04B 7/00* (2006.01)
*H04W 4/00* (2009.01)
*H04M 1/00* (2006.01)

(52) U.S. Cl. .............. 398/132; 398/187; 398/189; 455/41.2; 455/426.1; 455/569.1

(58) Field of Classification Search .......... 398/132, 398/107, 187, 109, 189; 455/557, 41.2, 426.1, 455/569.1; 379/433.05, 433.08, 56.3; 340/825.25, 340/825.72
See application file for complete search history.

(56) References Cited

U.S. PATENT DOCUMENTS

| | | | |
|---|---|---|---|
| 4,980,926 A * | 12/1990 | Noetzel | 398/117 |
| 5,027,433 A | 6/1991 | Menadier et al. | |
| 5,241,410 A | 8/1993 | Streck et al. | |
| 5,446,783 A * | 8/1995 | May | 455/557 |
| 5,495,357 A | 2/1996 | Osterhout | |

(Continued)

FOREIGN PATENT DOCUMENTS

EP 0 613 320 A2 8/1994

(Continued)

OTHER PUBLICATIONS

Kenwood Communications "SpyLab-The Over the Counter Spy Shop," [online; retrieved on Mar. 8, 2000]. From Internet URL: <http://www.spylab.com/twowayradios.htm>, 3 pages.

(Continued)

*Primary Examiner*—Dalzid Singh
(74) *Attorney, Agent, or Firm*—Mueting, Raasch & Gebhardt, P.A.

(57) ABSTRACT

A portable communication system provides a universal transmitter that couples to a communication device having an audio port, e.g., a cellular phone audio port, and which transforms the sound output into signals, e.g., infrared pulses, for transmission to a wireless receiver, e.g., a behind the ear or in the ear receiver.

68 Claims, 27 Drawing Sheets

U.S. PATENT DOCUMENTS

| | | | |
|---|---|---|---|
| 5,568,516 A | 10/1996 | Strohallen et al. | |
| 5,615,229 A | 3/1997 | Sharma et al. | |
| 5,636,264 A | 6/1997 | Sulavuori et al. | |
| 5,714,741 A * | 2/1998 | Pieterse et al. | 235/380 |
| 5,768,397 A * | 6/1998 | Fazio | 381/312 |
| 5,774,791 A | 6/1998 | Strohallen et al. | |
| 5,812,598 A | 9/1998 | Sharma et al. | |
| 5,867,794 A | 2/1999 | Hayes et al. | |
| 5,881,149 A | 3/1999 | Weatherill | |
| 5,907,418 A | 5/1999 | Walczak et al. | |
| 5,966,643 A | 10/1999 | Radley | |
| 6,151,149 A * | 11/2000 | Rybicki et al. | 398/191 |
| 6,236,969 B1 * | 5/2001 | Ruppert et al. | 704/275 |
| 6,281,811 B1 | 8/2001 | Ranzino | |
| 6,393,301 B1 | 5/2002 | Oda | |
| 6,421,426 B1 | 7/2002 | Lucey | |
| 6,694,034 B2 * | 2/2004 | Julstrom et al. | 381/315 |
| 7,095,981 B1 * | 8/2006 | Voroba et al. | 455/41.2 |

FOREIGN PATENT DOCUMENTS

| | | |
|---|---|---|
| EP | 0 665 655 A | 8/1995 |
| FR | 2 730 592 A | 8/1996 |
| GB | 2 103 043 A | 2/1983 |
| JP | 60154800 A * | 8/1985 |
| WO | WO 99/34576 | 7/1999 |

OTHER PUBLICATIONS

5M Technology H.K. "MG9901—Introducing the most advance Hands-Free system for Automobile," [online; retrieved on Mar. 8, 2000]. From Internet URL: <http://5mhk.com/MG9001.htm>, 2 pages.

Soloring.com, Inc., Garden Grove, CA, "What is wireless handsfree soloring?" [online; accessed on Oct. 30, 2000]. From Internet URL:<www.soloring.com>, 15 pages.

Soloring.com, Inc., Garden Grove, CA, "Meet the latest concept of wireless handfree" advertisement brochure, undated, 2 pages.

* cited by examiner

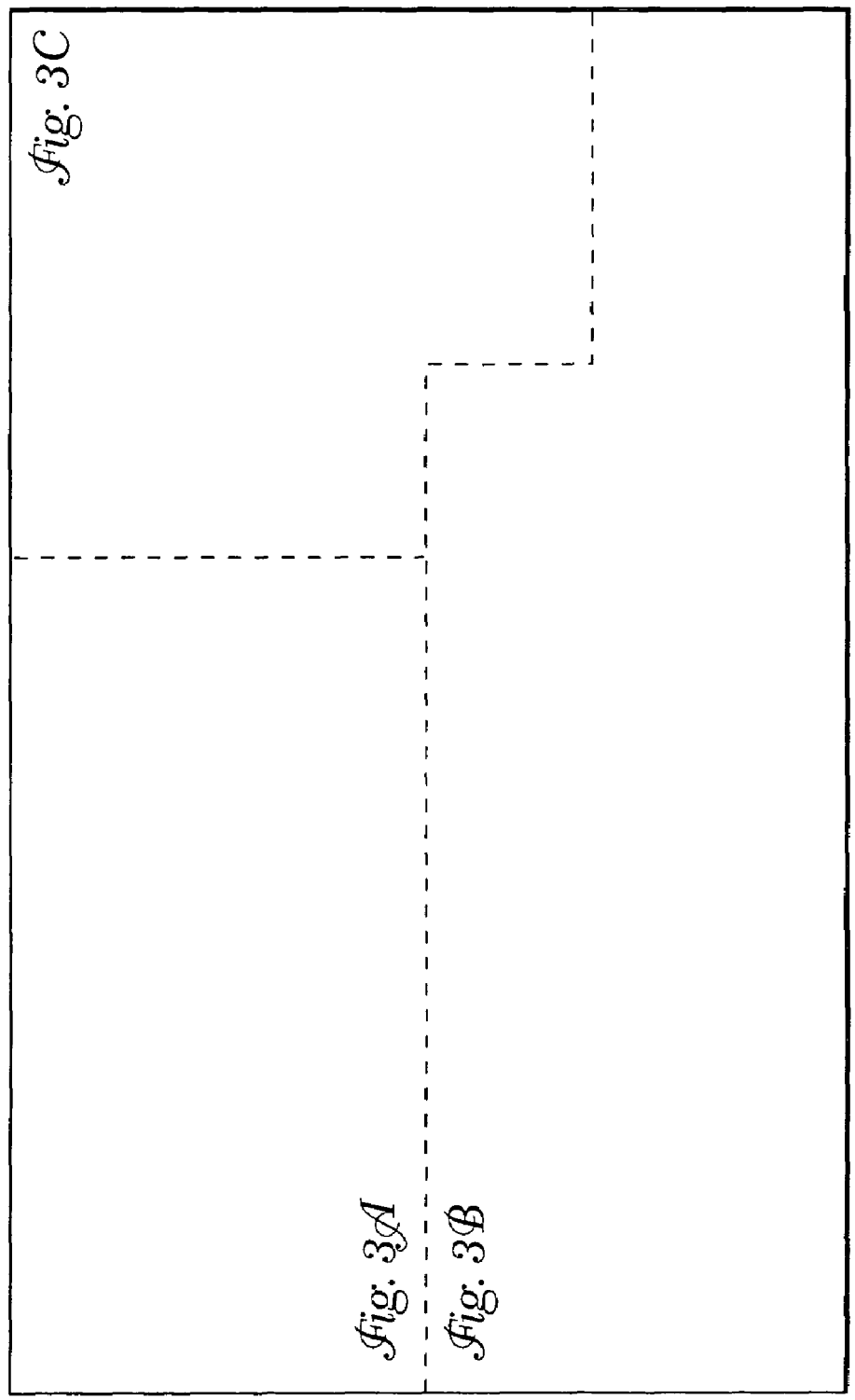

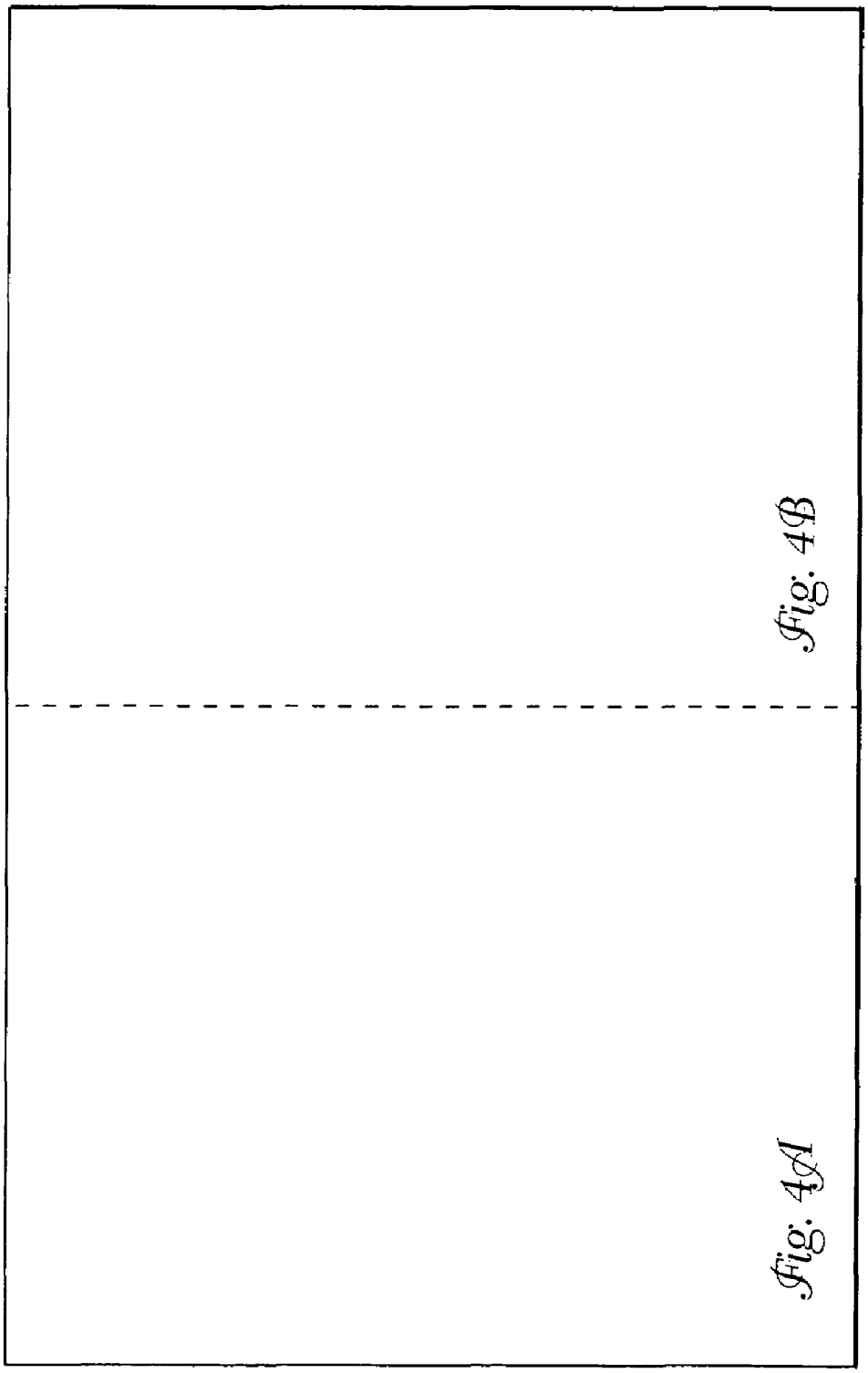

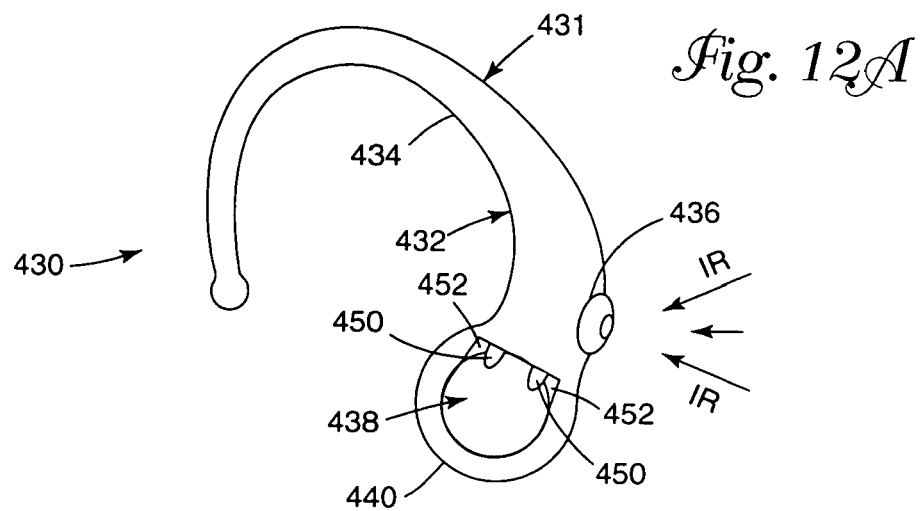
Fig. 12A
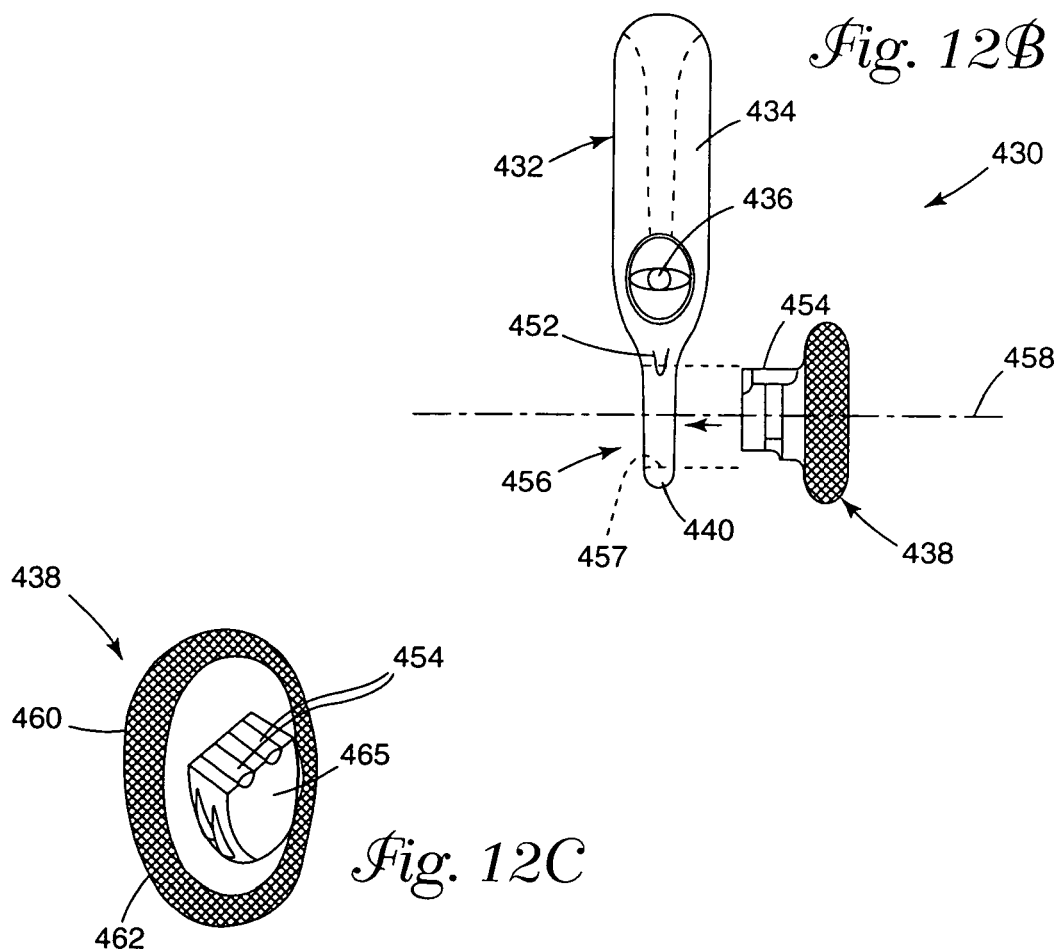
Fig. 12B
Fig. 12C

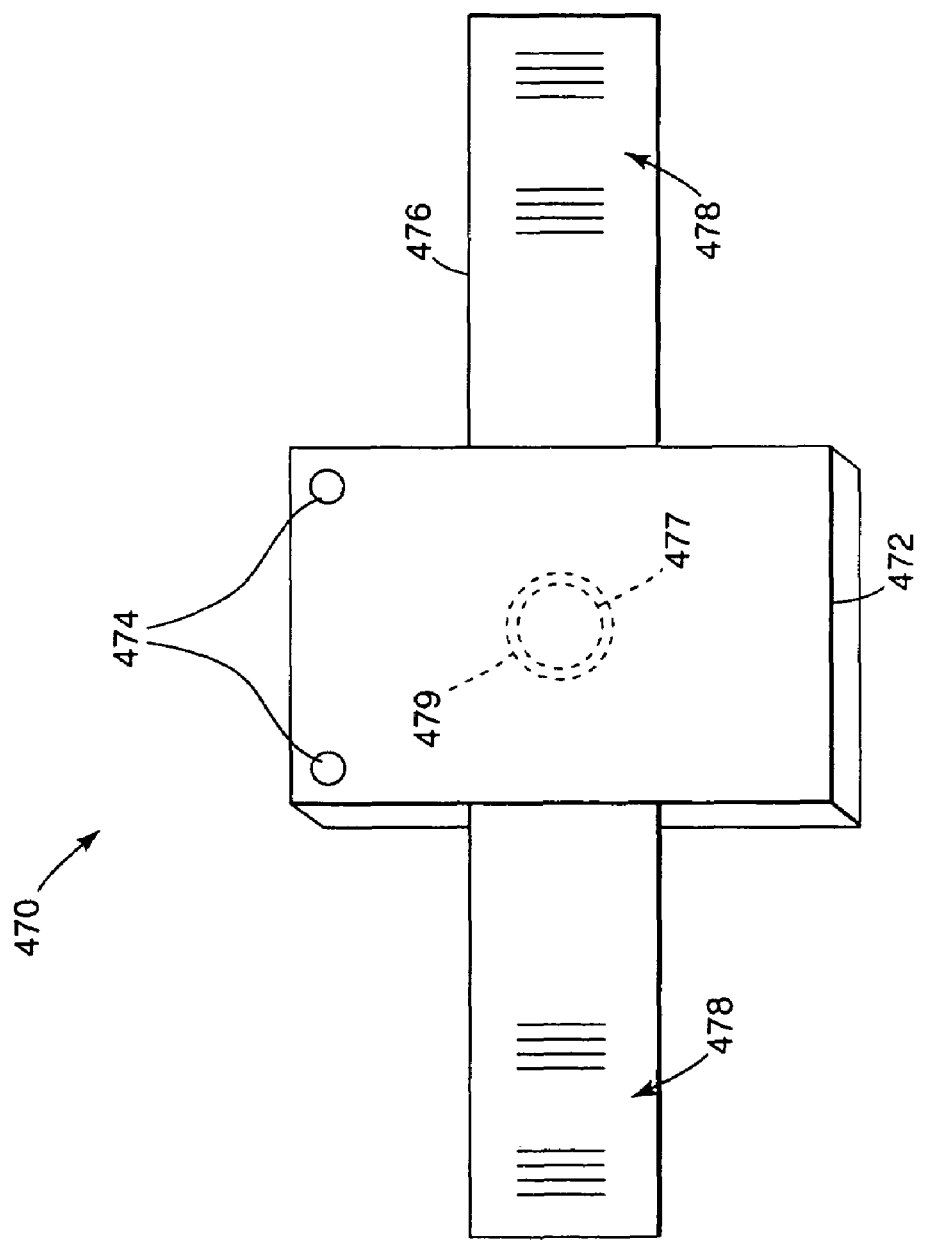

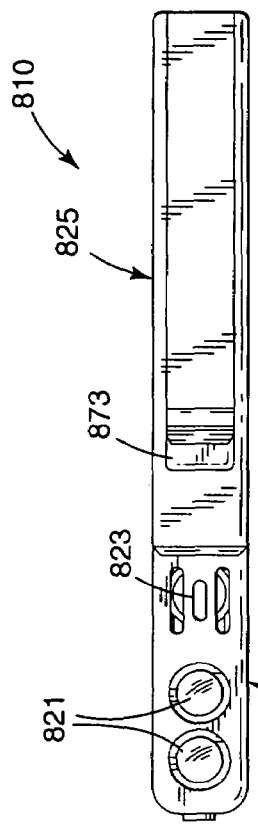
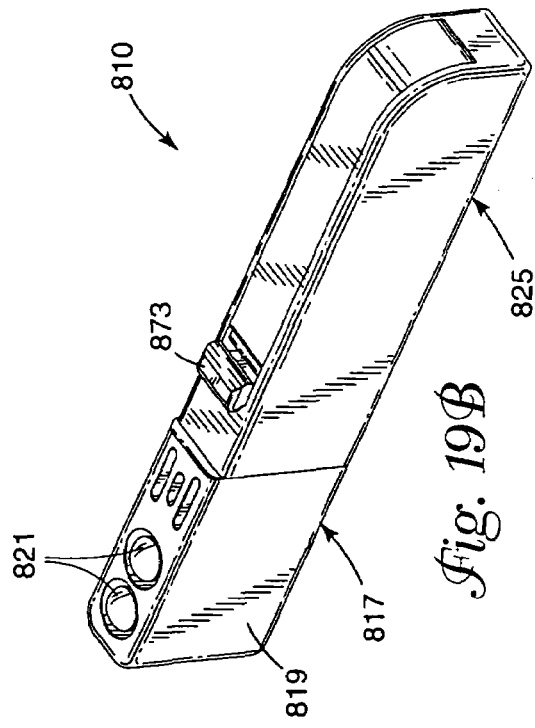
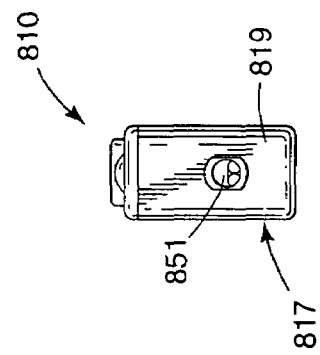
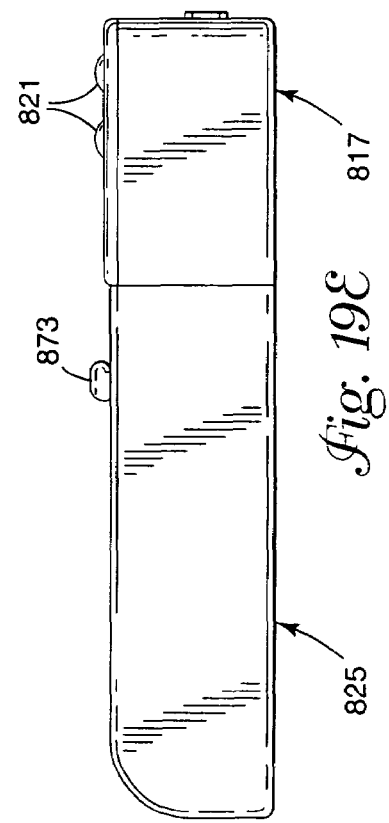

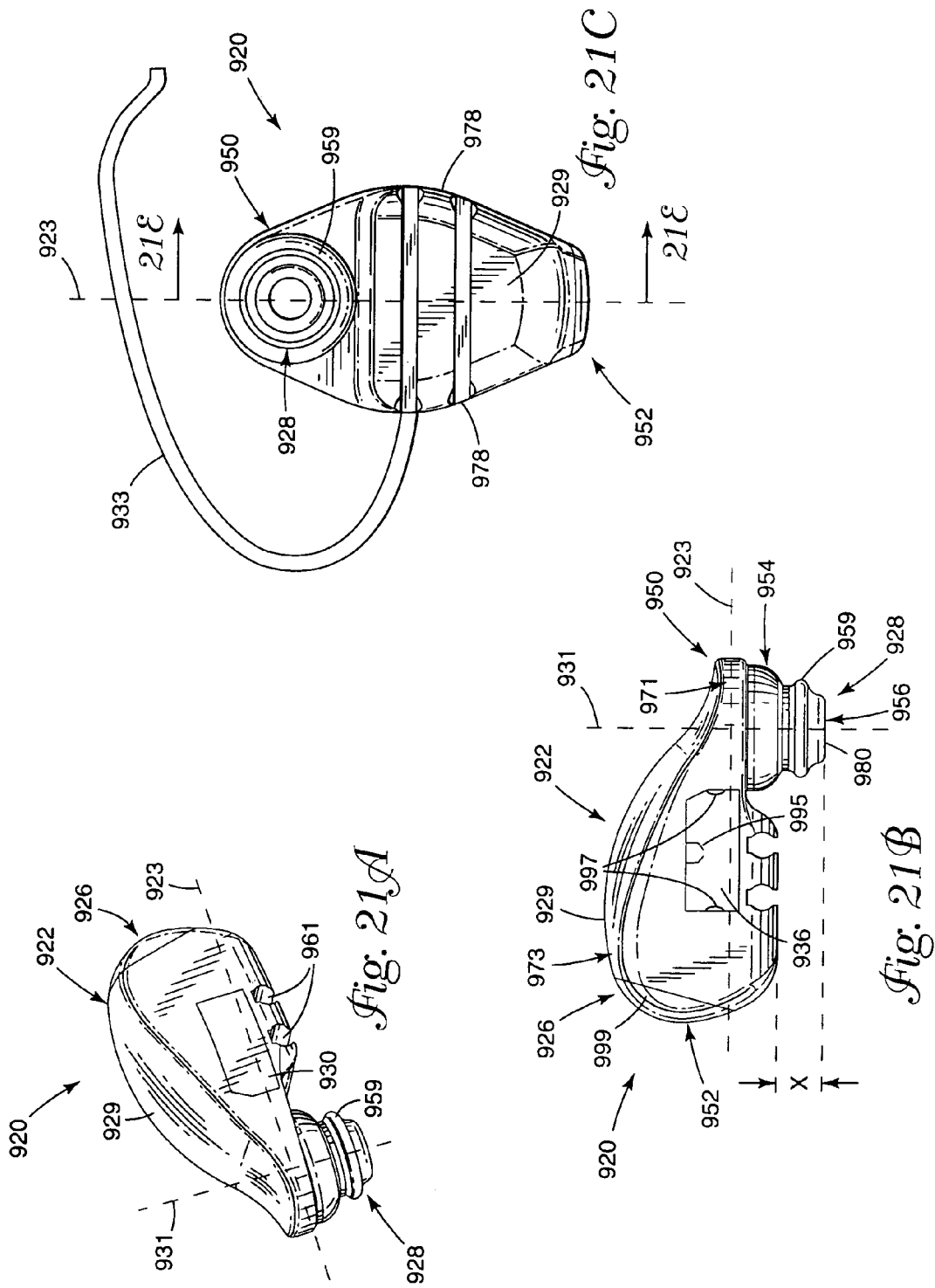

LOW POWER PORTABLE COMMUNICATION SYSTEM WITH WIRELESS RECEIVER AND METHODS REGARDING SAME

CROSS-REFERENCE TO RELATED APPLICATIONS

This application is a continuation-in-part of U.S. application Ser. No. 09/542,708 filed Apr. 4, 2000 now U.S. Pat. No. 7,095,981, which is incorporated herein by reference.

FIELD OF THE INVENTION

The present invention pertains to portable communication systems. More particularly, the present invention relates to portable wireless systems that employ a receiver and/or a transmitter, e.g., wireless infrared systems.

BACKGROUND OF THE INVENTION

Short range, wireless transmission of audio is an established and convenient manner for users to listen to sound sources such as television, stereo and computer multimedia devices without disturbing others. Typically, such privacy listening systems employ one or two earphones mounted into a headset that contains the receiver circuitry and power supply.

Generally, wireless communication systems use one of acoustic, radio frequency, infrared, and inductive techniques for short range transmission of audio. Radio frequency and infrared signal transmission are most commonly used for such short range transmission; however, magnetic induction is also used as described in U.S. Pat. No. 5,774,791 to Strohallen et al., entitled "Low Power Wireless Communication System Employing Magnetic Control Zones," issued Jun. 30, 1998.

As described in U.S. Pat. No. 5,774,791, a receiver configured as a behind the ear (BTE) hearing aid, an in the ear (ITE) hearing aid, or as a cordless headset is described. A transmitter unit, which may include a microphone for picking up external sounds, modulates audio sound to drive a magnetic transmission element, e.g., a neck loop, for transmission to the receiver. The receiver, which includes a magnetic receiving element, demodulates the received signal to provide a sound output to the user. In one embodiment of U.S. Pat. No. 5,774,791, a headset which includes the receiver containing the magnetic receiving element, also may include an infrared (IR) transmitter for transmitting signals back to a base station for two-way communication.

Various types of phones are available, such as cordless phones, cordless cellular phones, corded phones, etc. In particular, cellular phone usage has increased dramatically over the years. Most hand-held radiotelephones, such as mobile phones, or cordless telephones are designed to assume at least the size of a conventional handset during operation, e.g., a fixed handset configuration or a flip phone configuration, with the antenna being in close proximity to the user's head. Recently, health concerns over cell phone radiation and the safety concerns over use of the cell phones while driving (e.g., desire for hands free operation) invite significant new development in this technology.

Several earpiece receivers have been described for phones even though the generally sizeable circuitry and battery power requirements for IR receivers pose a significant challenge to subminiaturization and have generally precluded the use of a comfortable and convenient subminiature earpiece. For example, U.S. Pat. No. 5,881,149 to Weatherill, entitled "Portable Communications Device With Wireless Transmitter and Detachable Earpiece Including a Wireless Receiver," issued Mar. 9, 1999, describes a portable communication device, i.e., a phone, having a detachable receiver part which can be placed against the ear for use. The portable communications device has an integral transmitter for communicating with the detachable receiver part. Further, U.S. Pat. No. 5,966,643 to Radley, entitled "Hand-Held Radiotelephone Having Two-Part Construction," issued Oct. 12, 1999, describes a radiotelephone having an earpiece that is spatially separated from the other components of the radiotelephone and includes an IR receiver. The housing of the handheld radiotelephone includes an IR transmitter, i.e., the transmitter is integral with the radiotelephone.

It will be recognized that in each example, the transmitter is integral with the phone. As such, the external wireless earpiece receiver will only function with a particular type of phone.

Further, IR systems have been criticized for being restricted to line of sight communications. While line of sight communications provide for a relatively secure communication link, IR communications have been described as requiring considerable power. For example, the amount of power required by an IR receiver is generally proportional to the ambient light conditions in the user area and the range or distance from the transmitter. Thus, as the ambient light level increases, the power that is needed generally increases. In a like manner, as the range or distance from the transmitter to the receiver increases the power required also increases.

SUMMARY OF THE INVENTION

A portable communication system and components thereof are provided according to the present invention to overcome one or more of the problems described above. A system according to the present invention provides a transmitter that is coupled to a communication device having an audio port, e.g., a cellular phone audio port (e.g., a microphone/speaker port), and which transforms audio signal into signals, e.g., pulses, for transmission to a wireless receiver. Thus, at least for cellular phones, the type of phone or wire handset is generally irrelevant and the transmitter can be used with numerous types of phones and handsets. In at least one embodiment, a direct input to the transmitter from the audio port of the communication device provides privacy listening. Further, pulse code modulation provides the system according to the present invention with very low power consumption while achieving high quality communication. In addition, several designs of a wireless receiver, e.g., an ITE receiver are described.

The present invention may include one or more of the following features: a portable communication system for use by a user with a communication apparatus having an audio port, wherein the portable communication apparatus includes an infrared transmitter apparatus and an infrared receiver apparatus; a portable infrared transmitter apparatus that includes at least one audio port configured for receiving an audio signal representative of received audio input from the communication apparatus, at least one infrared light emitting device, modulation circuitry operable to convert the audio signal to one or more constant width electrical pulses to drive the infrared light emitting diode to transmit one or more corresponding constant width infrared pulses, a microphone coupled to the at least one audio port of the infrared transmitter apparatus and operable to generate an audio signal from received sound input of the user which is provided to the audio port of the communication apparatus via the audio port of the infrared transmitter apparatus, and a transmitter housing enclosing the modulation circuitry and the microphone and upon which the at least one infrared light emitting device is mounted; a transmitter housing that is of a size smaller than the communication apparatus and configured to be removably coupled onto the communication apparatus; and an infrared receiver apparatus that includes an infrared light detection device to detect the one or more corresponding infrared pulses and generate one or more electrical signals representative of the detected infrared pulses, a speaker, demodulation circuitry operable to convert the one or more electrical signals representative of the detected infrared pulses to an audio signal to power the speaker to produce a sound output, and a receiver housing formed to be self-supported by the ear of the user which encloses the speaker and the demodulation circuitry and upon which the infrared light detection device is mounted.

Other features of the present invention may include: a microphone that is coupled to the at least one audio port of the infrared transmitter apparatus via an amplification circuit to provide the audio signal with a gain, e.g., a gain in the range of 2 to 20; a transmitter housing removably attached to the phone apparatus such as by a two faced adhering system; a receiver housing that is securable within the concha of the ear; a receiver housing that is securable by the pinna of the ear; an audio port of the transmitter apparatus that is configured for wired connection to the microphone/speaker audio port of a phone apparatus by a cord/plug connector apparatus; modulation circuitry that includes pulse width modulation circuitry to convert the audio signal using a carrier signal to one or more width modulated pulses, an edge detect circuit to detect the edges of the one or more width modulated pulses and generate constant width pulses based on the detected edges, and a pulse driver circuit to drive an infrared light emitting device; modulation circuitry that includes voice activated power up circuitry; demodulation circuitry that includes pulse detection circuitry to convert the one or more electrical signals representative of the detected infrared pulses to one or more constant width pulses based thereon, pulse width convertor circuitry to convert the one or more constant width pulses to one or more width modulated pulses, and pulse width demodulation circuitry to convert the one or more width modulated pulses to an audio signal for application to the speaker; demodulation circuitry which includes at least amplification circuitry always operable in idle mode with power being supplied thereto when battery devices are connected for operation of the infrared receiver apparatus; a transmitter housing having a volume less than about 3 cm$^3$; a transmitter housing configured to be removably coupled to a removable battery apparatus; and a removable battery apparatus configured to receive at least one of button type batteries and cylindrical alkaline batteries.

The present invention may also include one or more of the following features: a portable communication system for use by a user with a communication apparatus having an audio port, wherein the portable communication system includes a transmitter apparatus and a receiver apparatus (e.g., an RF transmitter and RF receiver apparatus); a portable transmitter apparatus that includes at least one audio port configured to receive an audio signal representative of received audio input from the communication apparatus, modulation circuitry operable to convert the audio signal to one or more constant width electrical pulses to drive a transmitter to transmit one or more corresponding constant width pulses, a microphone coupled to the at least one audio port of the transmitter apparatus and operable to generate an audio signal from received sound input of the user which is provided to the audio port of the communication apparatus via the audio port of the transmitter apparatus, and a transmitter housing (e.g., a transmitter housing of a size smaller than the communication apparatus and configured to be removably coupled onto the communication apparatus) enclosing the modulation circuitry and the microphone; a receiver apparatus operable for communication with a transmitter apparatus that includes a detection device to detect the one or more corresponding pulses and generate one or more electrical signals representative of the detected pulses, a speaker, demodulation circuitry operable to convert the one or more electrical signals representative of the detected pulses to an audio signal to power the speaker to produce a sound output, and a receiver housing formed to be self-supported by the ear of the user enclosing at least the speaker and the demodulation circuitry; modulation circuitry that includes pulse width modulation circuitry to convert the audio signal using a carrier signal to one or more width modulated pulses, an edge detect circuit to detect the edges of the one or more width modulated pulses and generating constant width pulses based on the detected edges, and a pulse driver circuit to drive an RF transmitting device; and demodulation circuitry that includes pulse detection circuitry to convert one or more electrical signals representative of the detected pulses to one or more constant width pulses based thereon, pulse width convertor circuitry to convert the one or more constant width pulses to one or more width modulated pulses, and pulse width demodulation circuitry to convert the one or more width modulated pulses to an audio signal for application to the speaker.

Yet further, the present invention may include one or more of the following features of a method of using a portable communication system with a phone apparatus having an audio port: providing a removable transmitter that includes at least one audio port configured to receive an audio signal representative of received audio input from the communication apparatus, a transmitter device, modulation circuitry operable to convert the audio signal to an electrical signal to drive the transmitter device to transmit signals representative of the audio signal, a microphone coupled to the at least one audio port of the removable transmitter and operable to generate an audio signal from received sound input of a user which is provided to the audio port of the communication apparatus via the audio port of the removable transmitter, and a transmitter housing enclosing at least the modulation circuitry and the microphone; securing a removable transmitter onto a phone apparatus; providing a transmitter housing of the removable transmitter that is of a size smaller than the phone apparatus; providing a transmitter housing configured to be removably coupled to a removable battery apparatus; coupling a removable battery apparatus to the transmitter housing when the transmitter housing is secured onto the phone apparatus; securing the removable transmitter to the phone apparatus using a two faced adhering system; and detaching the removable transmitter from the phone apparatus and securing the removable transmitter to a different phone apparatus.

Yet further, one or more embodiments of a portable receiver apparatus according to the present invention include one or more of the following features: a receiver that includes a detection device to detect one or more pulses and generate one or more electric signals representative of the detected pulses, a speaker, demodulation circuitry operable to convert the one or more electric signals representative of the detected pulses to an audio signal to power the speaker to produce a sound output, and a housing enclosing at least the speaker and the demodulation circuitry with the receiver housing formed to be self-supported entirely by the ear of a user; a housing that includes a body portion extending from a first end to a second end along a body portion axis to enclose at least a portion of the demodulation circuitry and an ear retaining portion enclosing the speaker; an ear retaining portion that extends from the first end of a body portion along an axis of predominate sound direction of a speaker that is orthogonal to the body portion axis; an ear retaining portion that includes a compactable and expandable material for insertion in the concha of the ear; a detection device that includes an infrared light detection device positioned at the second end of the body portion to detect infrared pulses and generate the electrical signals representative of such detected infrared pulses; a body portion that includes an opening defined therein configured to receive a removable battery apparatus; a retaining structure to secure the battery apparatus in the opening; and a body portion that has a volume less than about 13 cm$^3$.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIG. 12A is a side view of the IR receiver apparatus of FIG. 10.

FIG. 12B is an exploded end view of the IR receiver apparatus of FIG. 12A.

FIG. 12C is a perspective rear view of a speaker portion of the IR receiver apparatus of FIG. 12B.

FIG. 13 is an illustrative view of an alternate embodiment of an IR transmitter apparatus having a band element for attachment to a phone apparatus.

FIG. 19A-E are more detailed views of the exemplary embodiment of a transmitter apparatus having a removable battery apparatus shown illustratively in FIGS. 18A-18B, wherein FIG. 19A shows the transmitter apparatus with a battery holding device or tray in an open position ready to have batteries loaded therein; FIG. 19B shows an assembled transmitter apparatus for attachment to a cellular phone; FIG. 19C shows An end view of the transmitter apparatus; FIG. 19D show a top view of the transmitter apparatus; FIG. 19E shows a side view of the transmitter apparatus.

FIGS. 21A-21E show another illustrative alternate embodiment of an IR receiver apparatus according to the present invention, wherein FIG. 21A is a perspective view of the receiver apparatus; FIG. 21B shows a side view of the receiver apparatus with a battery holding portion shown in FIG. 21D removed; FIG. 21C shows a plan view looking towards the ear retaining portion; and FIG. 21E shows a cross-section view of the IR receiver apparatus taken at line 21E-21E shown in FIG. 21C.

DETAILED DESCRIPTION OF THE EMBODIMENTS

Figure 1:
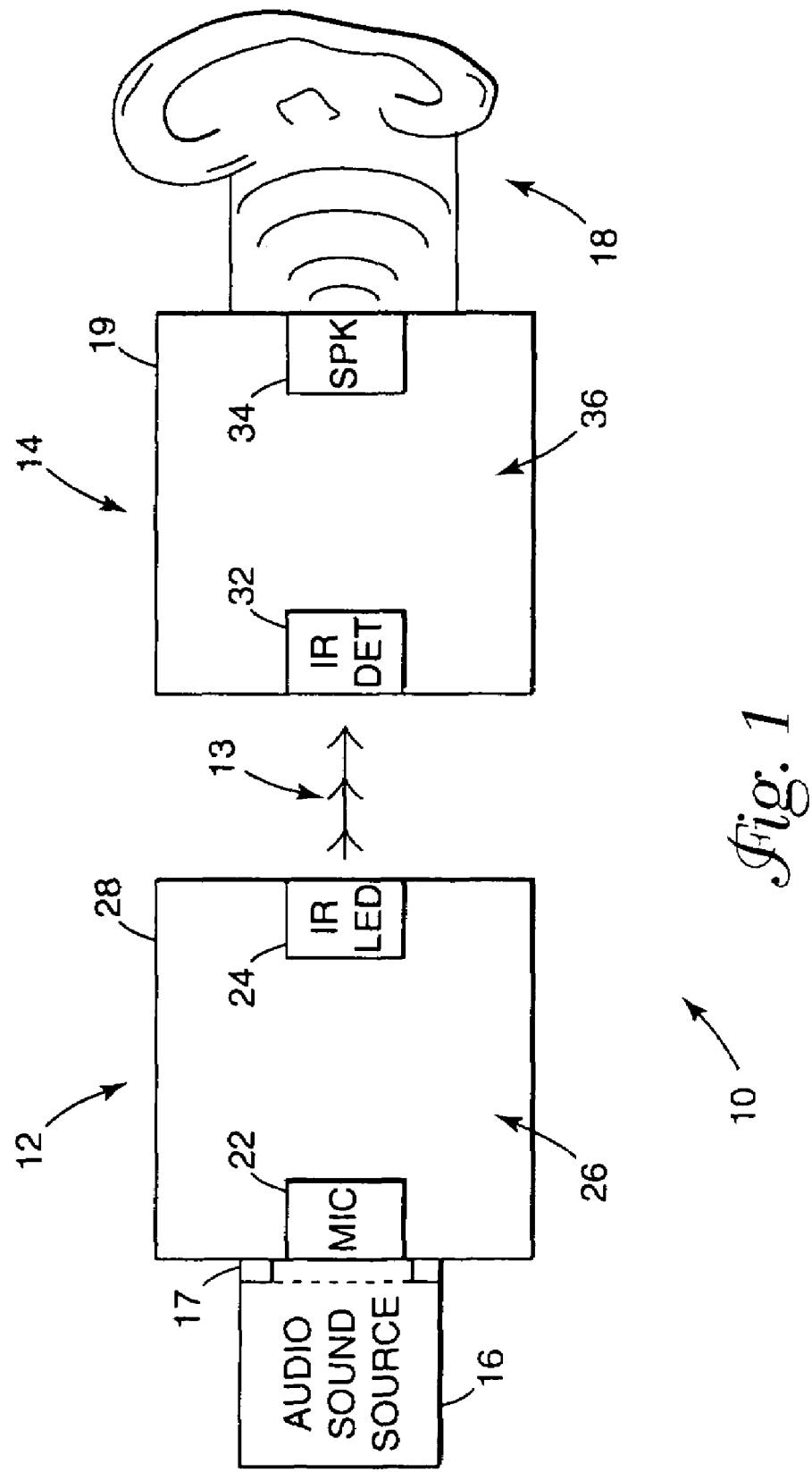
FIG. 1 is a general block diagram illustration of a portable communication system according to the present invention.

A portable communication system 10 according to the present invention shall be described generally with reference to FIG. 1. Thereafter, various embodiments of the portable communication system 10 and components thereof or used therewith shall be described with reference to FIGS. 2-16. Further, another alternate exemplary embodiment of a portable communication system 700 and exemplary components thereof according to the present invention shall be described generally with reference to FIGS. 17-21. One skilled in the art will recognize that various techniques and structure of one embodiment may be usable in another embodiment and that the scope of the present invention is not limited to the particular configurations shown. For example, the modulation and demodulation techniques described with reference to FIGS. 1-16 may be used, and in many cases are preferably used, in the embodiment of the portable system shown and described with reference to FIGS. 17-21. Further, for example, such modulation and demodulation techniques may be employed with RF communication, as well as infrared communication, in conjunction with the present invention as described with reference to FIGS. 17-21.

As shown in FIG. 1, portable communication system 10 includes an IR transmitter apparatus 12 which communicates by transmission of IR signals 13, preferably short IR pulses, with a portable IR receiver apparatus 14. Preferably, the IR transmitter is a universal wireless IR transmitter apparatus that mechanically couples to a communication device having a sound output source 16, e.g., a cellular phone handset, and which transforms the sound output into infrared signals 13 for transmission to the wireless receiver apparatus 14. It will be recognized that the present invention, or one or more portions of the invention as described herein, may be beneficially applied to various types of communication devices, e.g., televisions, computers, or any other apparatus having a sound output, electrical (e.g., the system of FIG. 16B, a television, etc.) or acoustical (e.g., a cellular phone, a corded phone handset, etc.), to which a transmitter apparatus can be coupled.

The IR transmitter apparatus 12 includes a transmitter housing 28 in which are located a microphone 22 and modulation circuitry 26. One or more IR emitting devices 24, e.g., IR light emitting diodes (LEDs), are positioned on the transmitter housing 28 for emission of IR signals 13 to the receiver apparatus 14. The microphone 22 is positioned for receiving sound output from an audio sound source 16. The audio source 16 may be any sound producing device of any communication apparatus, such as a television, a computer speaker, a radio, etc. Preferably, the sound source 16 is a speaker of a phone apparatus such as a handset, corded or wireless. More preferably, the audio sound source 16 is a speaker of a cellular phone.

Figure 11:
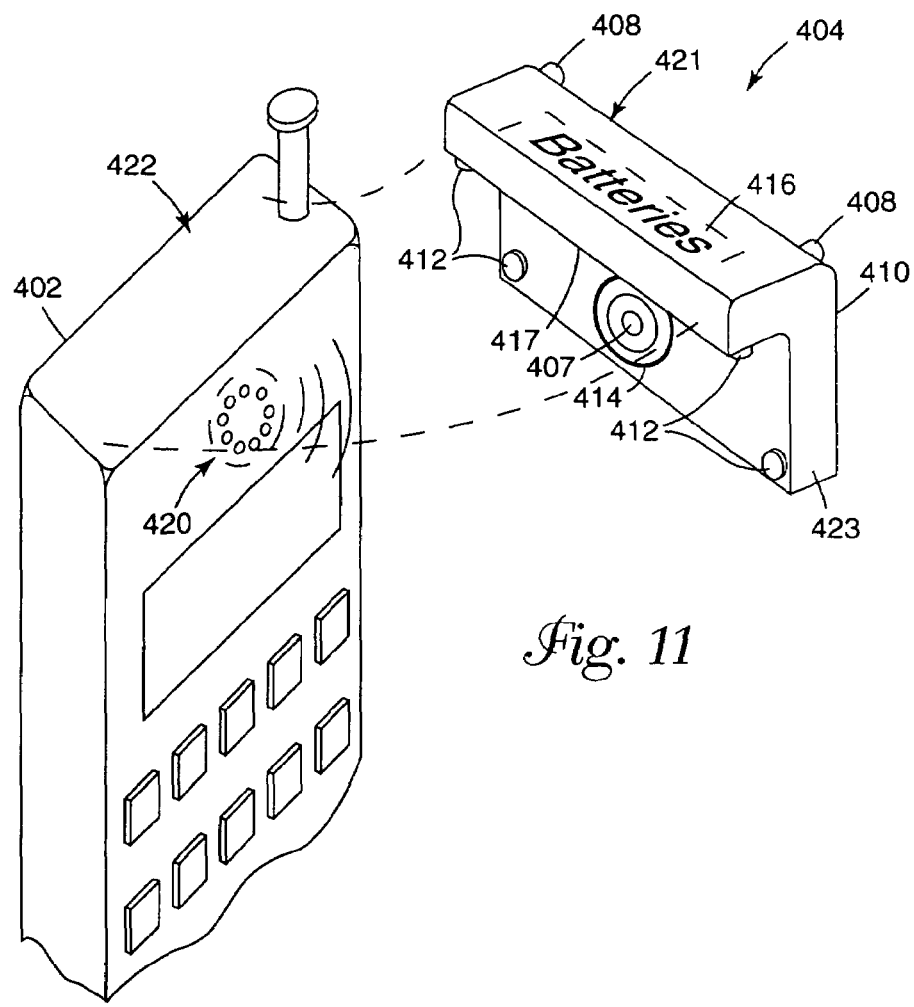
FIG. 11 is a more detailed perspective view of the IR transmitter apparatus of FIG. 10 and the phone with which it can be used.

The transmitter housing 28 is configured to be removably coupled by a coupling device 17 to the communication apparatus, e.g., cellular phone, such that the microphone 22 is positioned adjacent the sound output device 16, e.g., speaker of the phone. Preferably, the microphone 22 is isolated so as to receive only sound from the audio sound source 16 to reduce external noise. Various types of coupling devices 17 are described herein with reference to the figures. For example, as shown in FIG. 11, the transmitter housing may be slipped over one end of a cellular phone, e.g., cap piece mounting. Further, for example, as shown in FIG. 13, the transmitter housing may include a band to wrap around a cellular phone. However, such coupling may be provided by any number of techniques. For example, two face mounting such as with the use of adhesive or hook and loop fasteners may be used, or any other mounting structure that allows the transmitter to be removed and used on another phone may be suitable. Compatibility of the transmitter apparatus for use with multiple communication apparatus, e.g., phones, is preferred.

The microphone 22 generates an audio signal from the received sound to be applied to the modulation circuitry 26. The modulation circuitry 26 provides a modulated signal to drive the IR light emitting device 24 for transmission of IR signals. Preferably, the modulation circuitry 26 is operable to convert the audio signal into a stream of electrical pulses to drive the IR light emitting device 24. Preferably, the audio signal is converted into a stream of constant width electrical pulses to drive the IR light emitting device 24 to transmit one or more corresponding constant width infrared pulses 13. Preferably, the pulse duration is less than about 2 microseconds. More preferably, the pulse duration is less than about 1 microsecond. The use of short pulses in the transmission of IR pulses, allows the power of such pulses to be increased without exceeding the average power rating of the IR light emitting device, e.g., IR LED.

The infrared receiver apparatus 14 includes an infrared light detection device 32 (e.g., an IR sensitive photodiode), demodulation circuitry 36 and a speaker 34. The infrared light detection device 32 detects the IR signal transmitted by IR transmitter apparatus 12. Preferably, the infrared light detection device 32 detects infrared pulses transmitted thereby. The IR light detection device 32 generates one or more electrical signals representative of the detected infrared pulses. The one or more electrical signals are applied to demodulation circuitry 36. Demodulation circuitry 36 is operable to convert the one or more electric signals representative of the detected infrared signals, e.g., pulses, to an audio signal to power the speaker to produce a sound output to be provided to the ear 18 of a user. One skilled in the art will recognize that any modulation and demodulation circuitry may be used for providing communication according to the present invention as long as they are compatible circuits, i.e., the demodulator circuitry is capable of demodulating the modulated signal. For example, several modulation and demodulation techniques are described herein with reference to FIGS. 2-9. Further, other modulation techniques are described in U.S. Pat. No. 5,774,791.

The IR receiver apparatus 14 further includes a portable receiver housing 19. The receiver housing 19 encloses the speaker 34 and the demodulation circuitry 36. The infrared light detection device 32 is mounted on the receiver housing 19. Further, preferably, the receiver housing 19 is formed to be self-supported entirely by the ear of a user. Preferably, the receiver housing 19 is either securable within the concha of the ear or the receiver housing 19 includes a behind the ear element securing the receiver housing 19 by the pinna of the ear. Various configurations of a receiver housing 19 according to the present invention are described herein with reference to FIGS. 12 and 14. However, other forms are contemplated in accordance with the present invention and the universal transmitter 12 as described herein may be used with any wireless receiver configuration, including in the ear or behind the ear configurations as well as wireless headsets.

The portable nature of the IR communication system 10 is attained at least in part through the selection of appropriate modulation and demodulation circuitry. For example, large power requirements for such circuitry generally force an increase in the size of the IR transmitter apparatus and IR receiver apparatus. As such, lower power techniques are used to reduce the size of the components of the present invention, e.g., require less and/or smaller batteries. Further, the complexity of the modulation and demodulation circuitry tends to increase part count leading to a larger size IR transmitter apparatus and IR receiver apparatus as well as to an increase in the cost for the system components. The following description of modulation and demodulation circuitry provided with reference to FIGS. 2-9 provides simple and low power techniques to reduce the size of the transmitter apparatus and receiver apparatus of a portable communication system 10.

Figure 2:
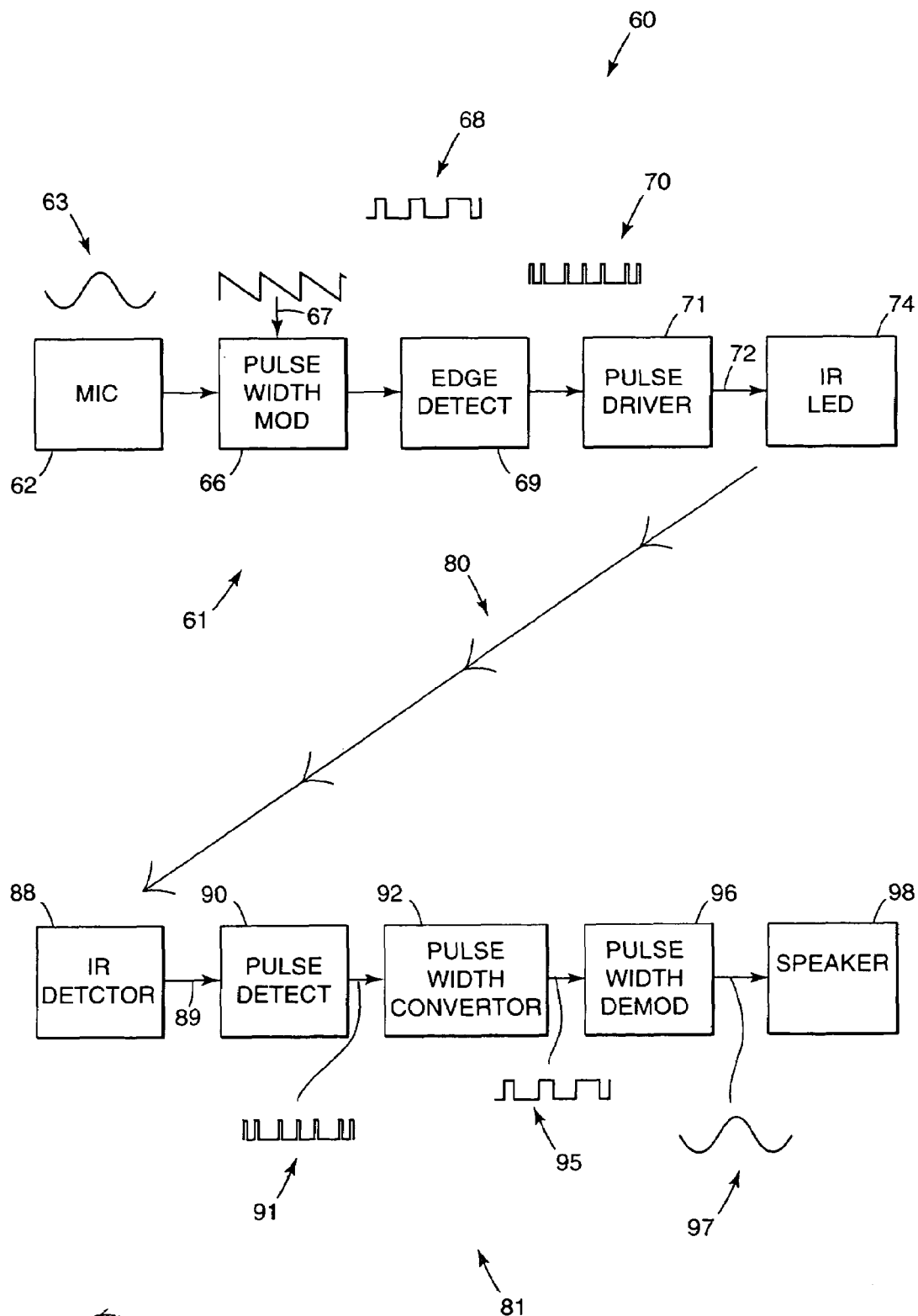
FIG. 2 is a block diagram of one illustrative embodiment of a portable communication system shown generally in FIG. 1.

FIG. 2 shows a block diagram of one illustrative embodiment of a portable communication system 60. The portable communication system 60 of FIG. 2 includes modulation circuitry 61 to convert an audio signal 63 from a microphone 62 to a stream of electrical pulses 72 for driving an IR LED 74 to transmit IR pulses 80. An IR photodiode 88 detects the IR pulses 80 and generates one or more electrical signals 89 representative of the detected IR pulses. The portable communication system 60 further includes demodulation circuitry 81 to convert the electrical signals to an audio signal 97 to power the speaker 98.

The modulation circuitry 61 includes pulse width modulation circuit 66, edge detect circuit 69, and pulse driver 71.

With use of such circuitry a constant width pulse stream 70 is applied to the pulse driver 71 to drive the IR LED 74 with a stream of corresponding pulses 72. Preferably, a repetitive substantially linear waveform 67 of fixed repetition rate, i.e., a cyclic waveform having a predetermined total cycle time or period (e.g., a 50 kHz signal having a 20 μsec duty cycle), is provided to pulse width modulation circuit 66 to be modulated by the audio signal 63. The pulse width modulation circuit 66 generates a modulated pulse stream 68 wherein the width of the pulses vary according to the amplitude of the audio signal 63. Thereafter, the pulse width modulated pulse stream 68 is applied to an edge detect circuit 69. The edge detect circuit 69 detects the positive and negative transitions of each pulse of the pulse width modulated pulse stream 68 and generates a stream of constant width short pulses 70, i.e., constant duration pulses, in response to the detected edges or transitions of the pulse width modulated pulse stream 68.

Preferably, the constant width pulses of the stream of pulses 70 have a duty cycle that is less than 10 percent of the total cycle time of the carrier frequency or input linear repetitive signal 67. More preferably, the duty cycle of the constant width pulses of the stream of pulses 70 is less than 5 percent of the total cycle of the carrier frequency or input linear repetitive signal 67. In other words, for a 50 kHz signal having a 20 μsec cycle time, the constant width pulses are preferably less than about 2 μsec, and more preferably less than about 1 μsec. The short pulse duration allows the IR LED to be driven by a higher amplitude pulse without exceeding the average power limits of the IR LED. Such an increase in the power used to drive the IR LED results in an increased distance of detection for the transmitted pulses and/or a better quality received signal. For example, a 10 percent duty cycle means that the IR LED can be pulsed 10 times harder than normal without exceeding the average power limit of such devices. As such, the IR LED can be seen a greater distance away because the LED may shine 10 times brighter. Further, to detect such pulses, generally the input stage devices of a receiver apparatus can operate with less amplification and/or be operable for shorter periods of time which decreases power usage by the receiver.

For example, the audio signal 63 may be sampled at a constant frequency of about 50 kHz by a sawtooth waveform 67, e.g., the input carrier signal. The duty cycle of the 50 kHz carrier is made to vary in proportion to the amplitude of the audio signal 63 to result in the pulse width modulated stream 68. Every edge or transition of this pulse width modulated 50 kHz carrier signal 68 generates a very short duration pulse, with each pulse being of a constant width. These pulses are sent to pulse driver 71 to drive the IR LED 74. Since there are two pulses for every cycle of 50 kHz sampling, the total on-time duty cycle will be double that of each pulses on time. Hence, to achieve a 10 percent transmission duty cycle, each pulse will need to have a duty cycle of 5 percent of the total cycle time. Likewise, to achieve a 20 percent transmission duty cycle, each pulse will need to have a duty cycle of 10 percent of the total cycle time.

The demodulation circuitry 81 includes pulse detect circuit 90, pulse width converter circuit 92, and pulse width demodulation circuit 96. With use of such circuitry a stream of electrical signals 89 from an IR photodiode 88 representative of received IR pulses 80 are converted to an audio signal 97 for application to speaker 98. The IR photodiode 88 detects the IR pulses 80 transmitted by IR LED 74 and generates an electrical signal 89 as a function of the detected pulses. The electrical signal 89 is provided to the pulse detect circuit 90 that receives, amplifies and converts the electrical signal from the IR photodiode 88 to a stream of pulses 91 representative of the detected IR pulses 80. This stream of pulses 91 will be similar to the pulse stream 70 generated in the modulation circuitry 61, at least with respect to the time between pulses. The stream of pulses 91 is then applied to the pulse width converter circuit 92 which converts the pulse stream 91 to a pulse width modulated stream of pulses 95. The stream of pulse width modulated pulses 95 include pulses having varied widths, substantially similar to those of pulse stream 68 generated in the modulation circuitry 61. This stream of pulse width modulated pulses 95 is then applied to pulse width demodulation circuit 96 which generates the audio signal 97 therefrom. For example, the demodulation circuit 96 filters the pulse width modulated stream of pulses 95 to obtain the audio signal 97 to be applied to speaker 98.

For example, using the 50 kHz input signal parameters described above, the IR pulses 80 are detected by the IR photodiode 88 and electrical signals representative thereof are buffered, amplified, and converted to digital pulses by the pulse detect circuit 90. These pulses are used to toggle a pulse width converter 92, e.g., a flip flop circuit or a divide by two circuit, to convert the edge driven pulses back to the original duty cycle of the pulse width modulated 50 kHz carrier signal 95 which was used to generate them. The pulse width modulated 50 kHz carrier signal 95 is then filtered by pulse width demodulation circuit 96 to leave the audio signal 97 to power the speaker 98.

Figure 3A:
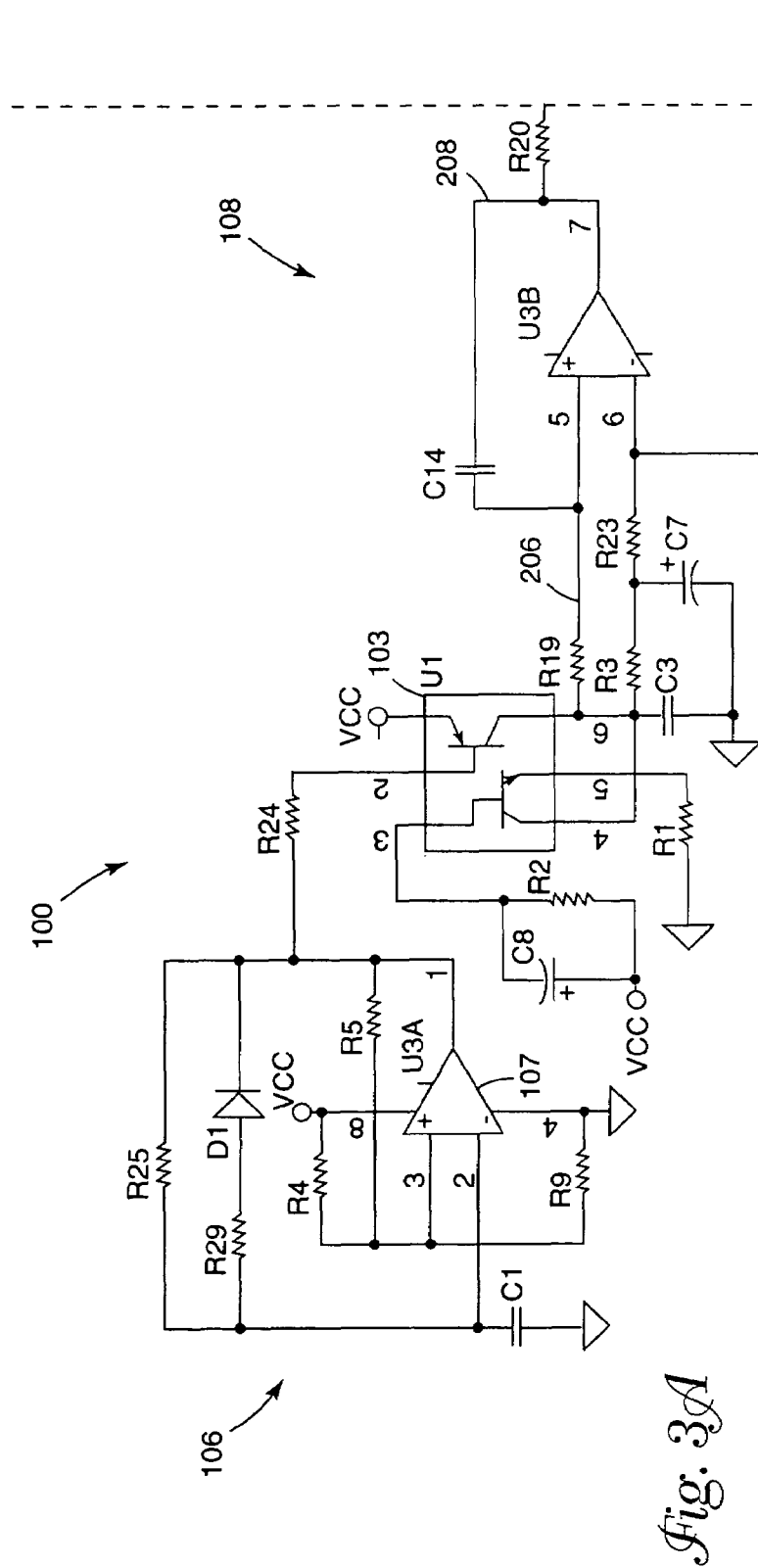
FIG. 3 is a schematic diagram of one illustrative embodiment of an IR transmitter apparatus of a portable communication system shown generally in FIG. 2.
Figure 3B:
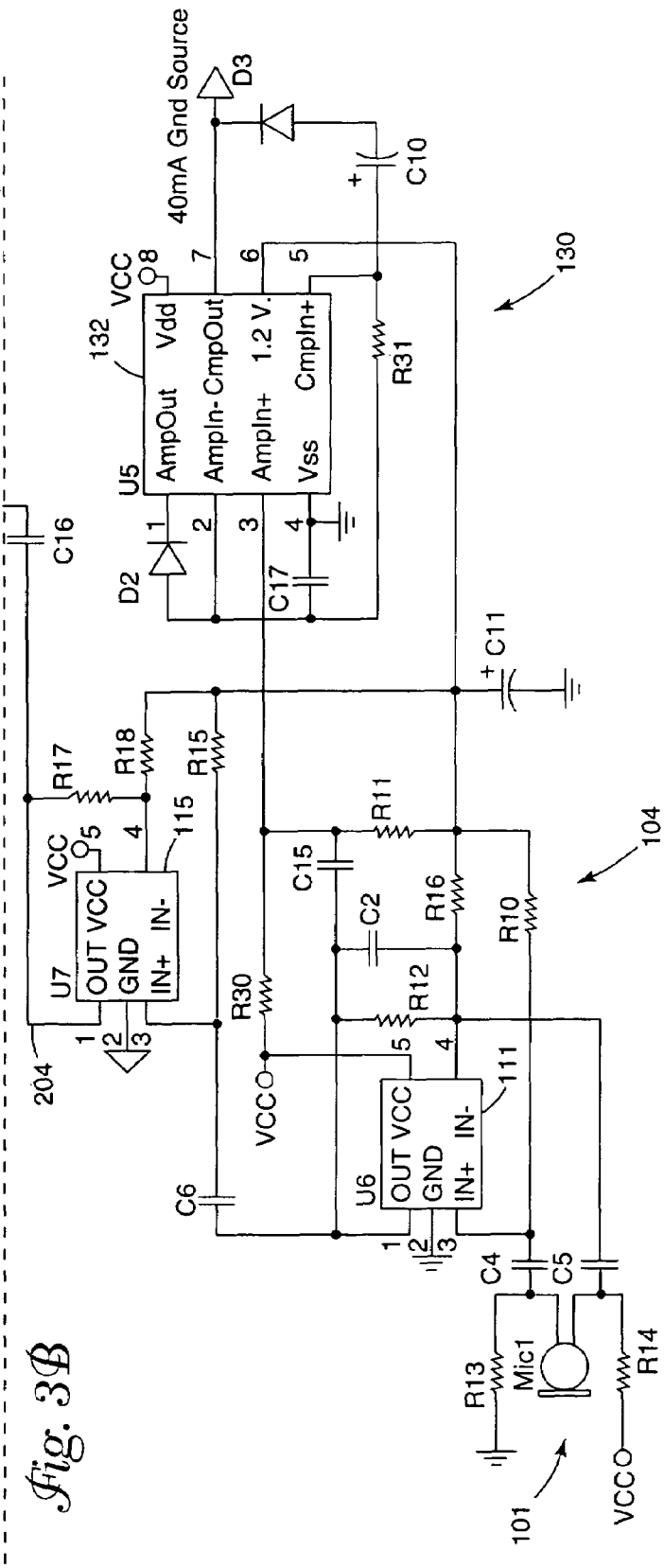
Figure 3C:
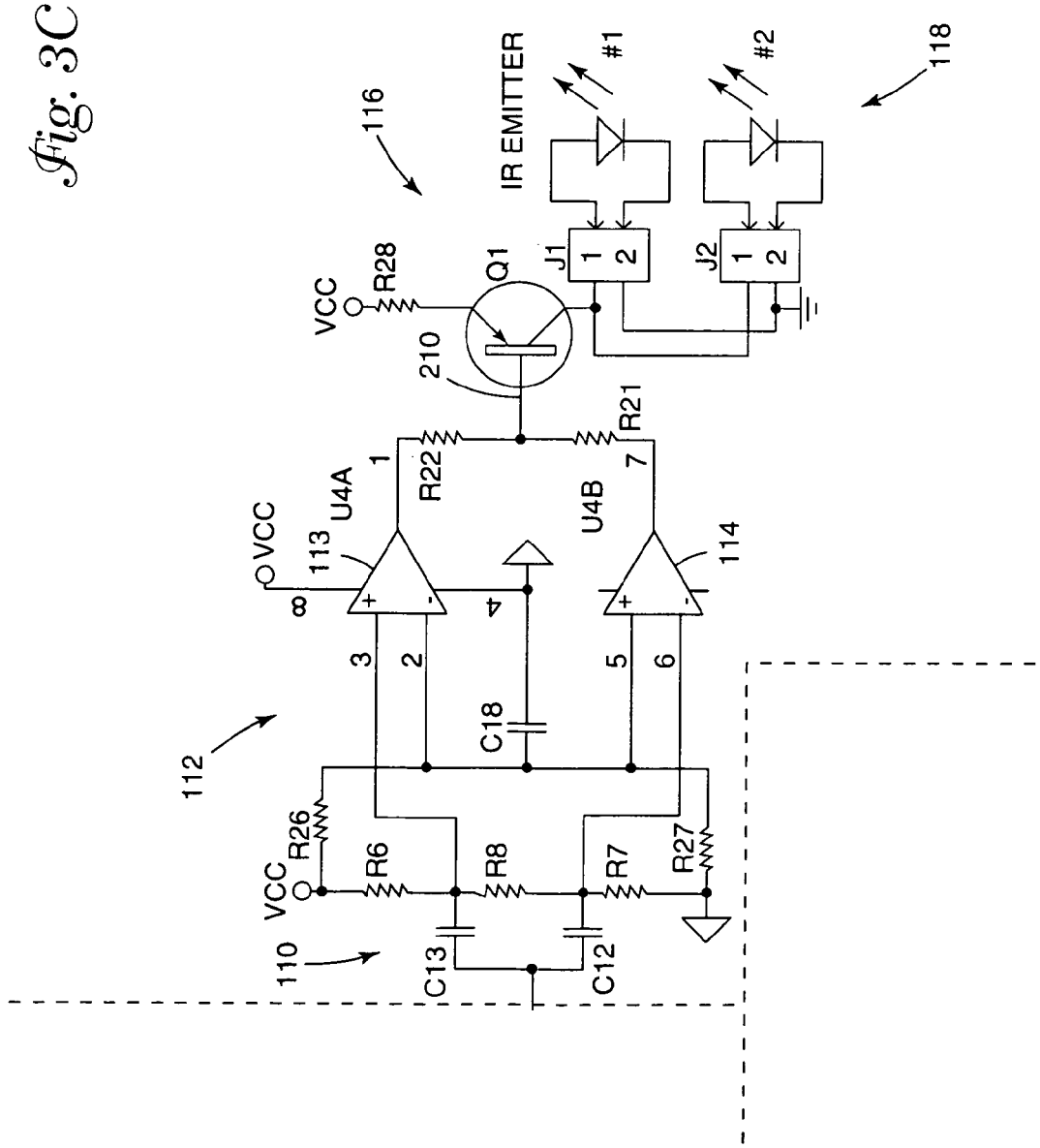

FIG. 3 shows a schematic diagram of one illustrative embodiment for implementing the IR transmitter apparatus shown generally in FIG. 2. However, it will be recognized that various other alternative implementations may be used that fall within the scope of the present invention. The sound switched transmitter circuit 100 shown in FIG. 3 includes a microphone 101, a sawtooth generator circuit 106, a microphone amplifier circuit 104, a sound activated power up circuit 130, a comparator circuit 108, an edge detect or edge to pulse conversion circuit 112, a pulse driver circuit 116, and LEDs 118. The operation of such circuits shall be described with reference to the waveform diagram 202 of FIG. 5.

The microphone 101 picks up sound input and applies an audio signal to microphone amplifier circuit 104 including amplifiers 111 and 115. The audio signal as amplified by amplifier 111 is applied to sound activated power up circuit 130 to determine the presence of an audio signal having sufficient amplitude such that other transmitter circuitry should be supplied with power, including amplifier 115. The sound activated power up circuit 130 includes an amplifier/comparator circuit 132, and also power switch circuitry, used to perform peak detection and to compare the peaks detected to a reference signal. Upon receipt of an audio signal having an amplitude above a certain predetermined limit, power is switched on to other portions of the transmitter circuit via ground connections, including power to amplifier 115.

Figure 5:
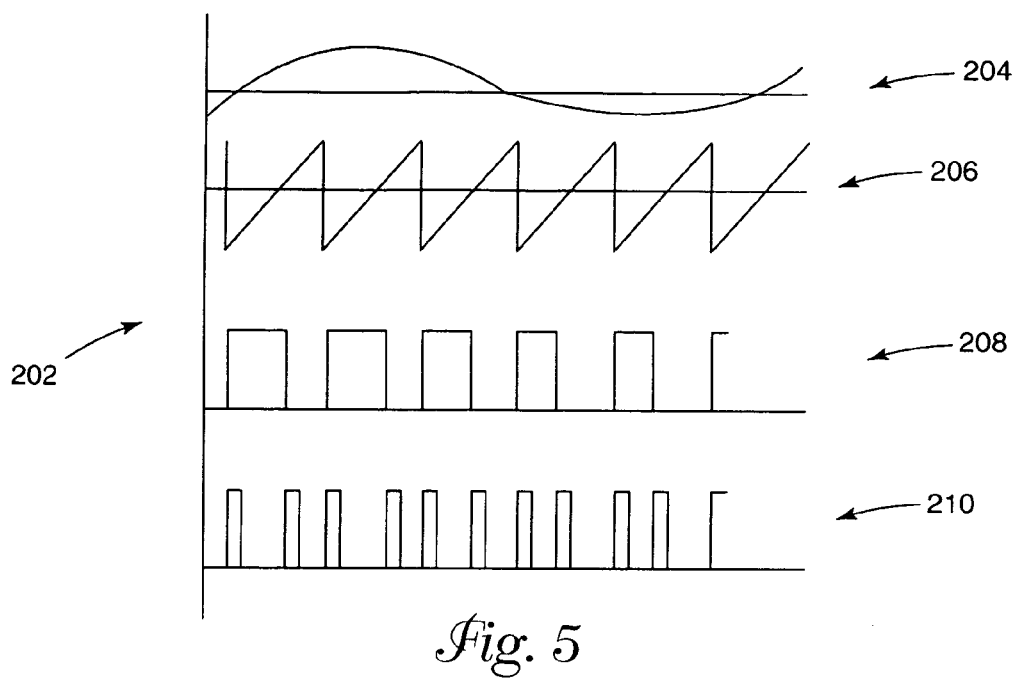
FIG. 5 is a waveform diagram used to illustrate the functions provided by the IR transmitter apparatus of FIG. 3.

The audio signal amplified by amplifier 111 is provided to amplifier 115 and amplified thereby when power is provided thereto. As such, the audio signal 204 having a desired amplitude, as shown in FIG. 5, is applied to the negative input of comparator circuit 108. The sawtooth generator circuit 106 generates a ramped 50 kHz sawtooth waveform 206 as shown in FIG. 5. One skilled in the art will recognize that other cyclic waveforms may be suitable for use according to the present invention. The comparator 107 is used to reset the sawtooth pulse every 20 μseconds and the dual transistor package 103 is used to provide the desired ramp for the waveform 206. The sawtooth waveform 206 is applied to the positive input of comparator circuit 108. The comparator circuit 108 compares the audio signal 204 and the sawtooth waveform 206, and generates an output that is a pulse width modulated waveform 208 as shown in FIG. 5. In other words, the width of the pulses vary according to the amplitude of the audio signal 204.

The pulse width modulated waveform 208 is applied to edge detect circuit 112. The edge detect circuit 112 includes dual comparators 113 and 114. The leading edge of a pulse of the pulse modulated waveform 208 turns on comparator 113 and generates a constant width pulse therefrom. The trailing edge of a pulse of the pulse modulated waveform 208 turns on comparator 114 and generates a constant width pulse therefrom. The polarity of such stream of constant width pulses 210, as shown in FIG. 5, generated based on the leading and trailing edges of the pulse width modulated waveform 208 are not important. The width of the pulses generated is controlled by pulse width limiting circuit 110 of edge detect circuit 112. For example, a reduction in capacitor values in the limit circuit 112 result in a shorter width pulse being generated. This generation of pulses from the pulse width modulated waveform 208 may be referred to as pulse code modulation.

As described previously, preferably, the constant width pulses of the stream of pulses 210 have a duty cycle that is less than 10 percent of the total cycle of the sawtooth waveform 206, more preferably, 5 percent of the total cycle. In other words, for the 50 kHz signal having a 20 μsec duty cycle, the constant width pulses are preferably less than about 2 μsec, and more preferably less than about 1 μsec.

The stream of constant width pulses 210 are applied to pulse driver circuit 116. The IR LEDs 118 are then driven by pulses from the pulse driver circuit 116 such that corresponding pulses of IR light are emitted therefrom.

Figure 4A:
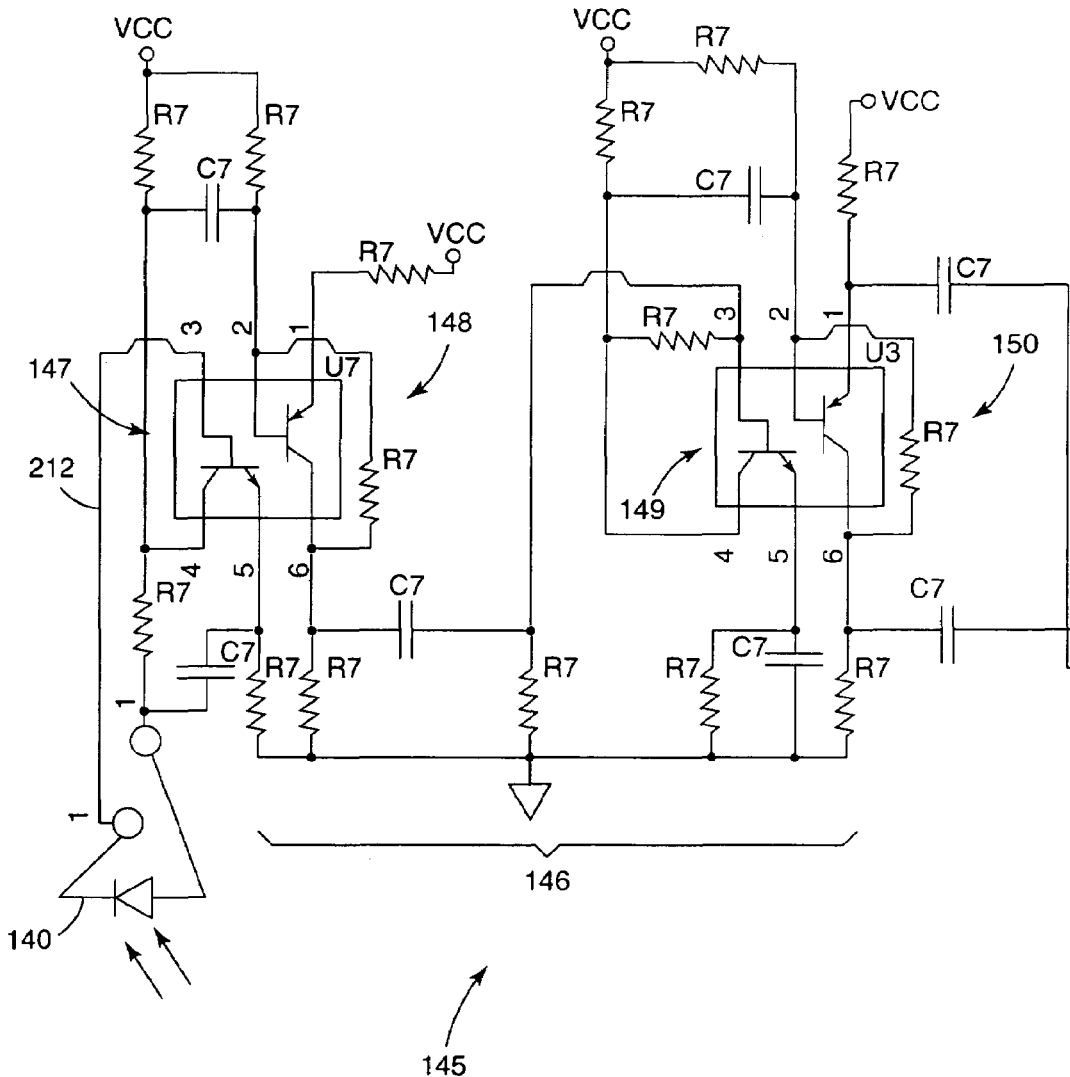
FIG. 4 is a schematic diagram of one illustrative embodiment of an IR receiver apparatus of a portable communication system shown generally in FIG. 2.
Figure 4B:
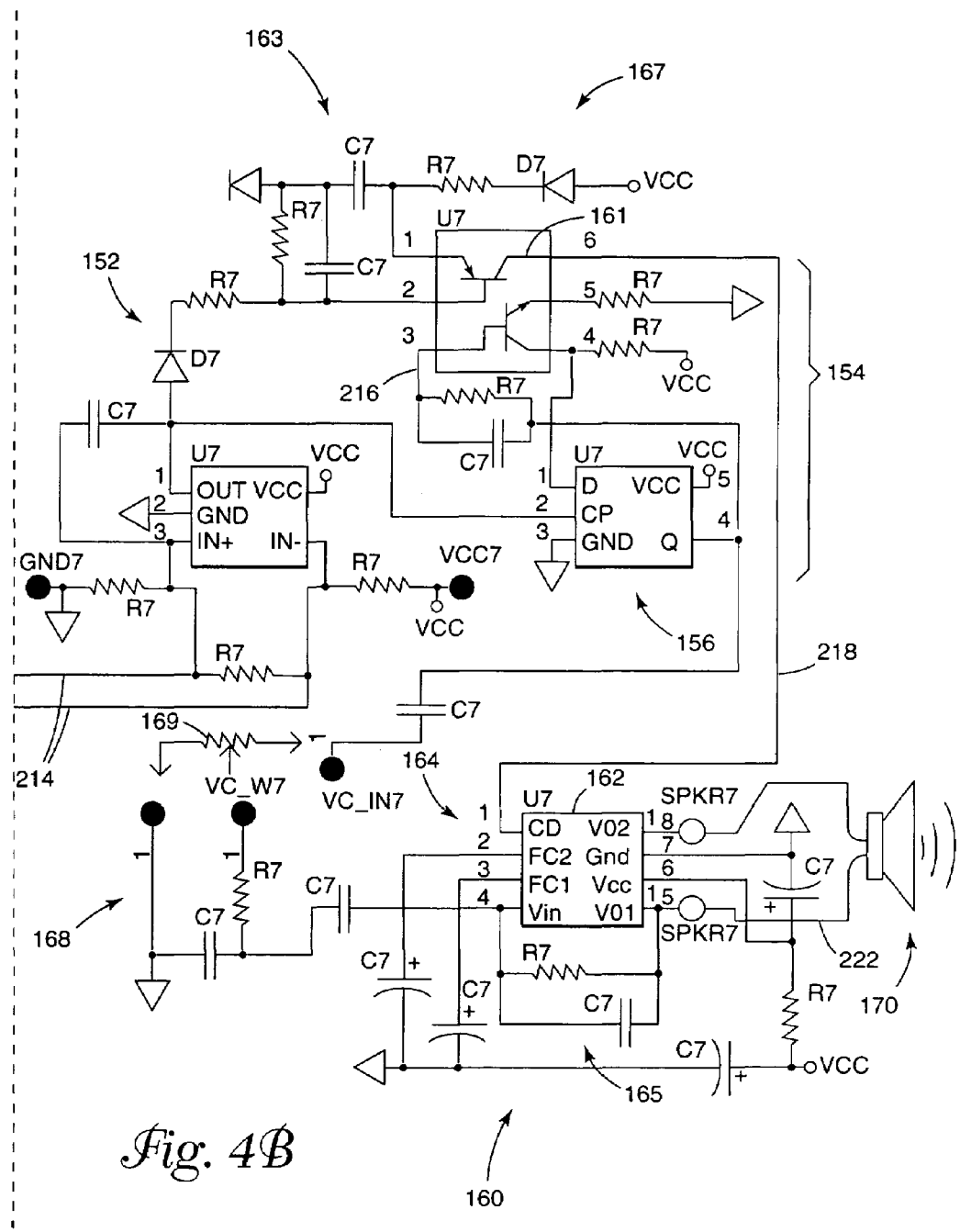

FIG. 4 shows a schematic diagram of one illustrative embodiment for implementing the IR receiver apparatus shown generally in FIG. 2. However, it will be recognized that various other alternative implementations may be used that fall within the scope of the present invention. For example, retriggerable and resettable one shot circuits along with logic gating may be used to implement functionality such as that provided by the flip flop. The IR receiver circuit 145 shown in FIG. 4 includes an IR sensitive photodiode 140, an amplification circuit 146, a comparator circuit 152, a pulse width converter circuit 154, a pulse width demodulation circuit 160, a volume control circuit 168, missing pulse detection circuit 167, and a speaker 170. The operation of such circuits shall be described with reference to the waveform diagram 216 of FIG. 6.

Figure 6:
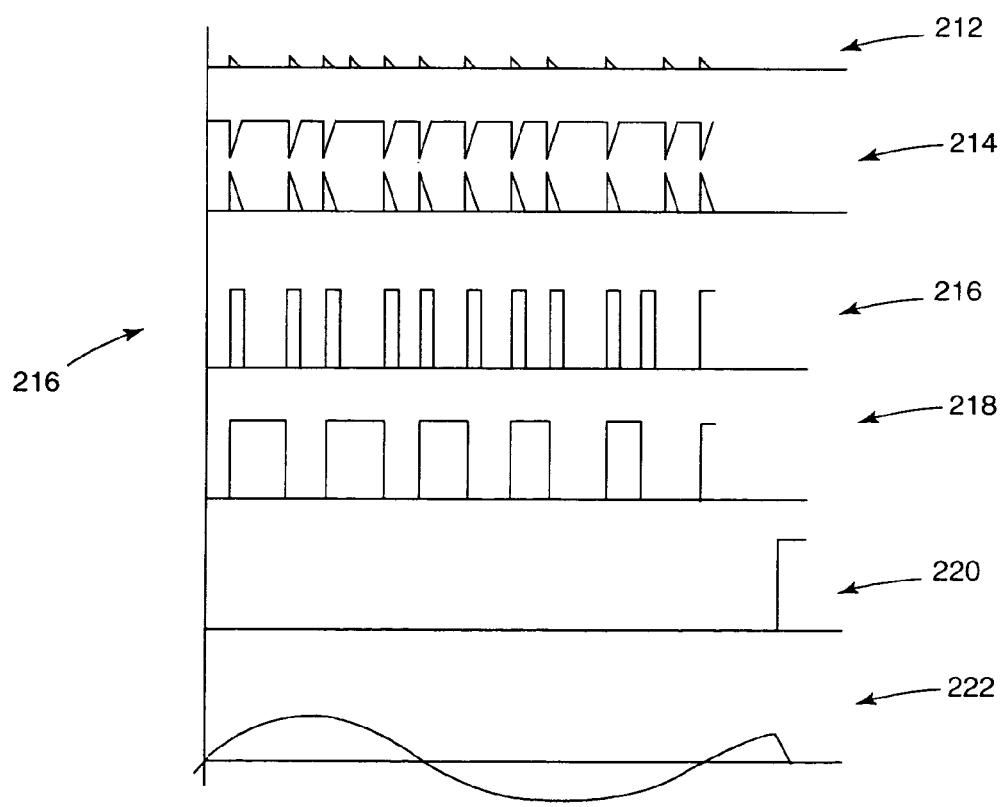
FIG. 6 is a waveform diagram used to illustrate the functions provided by the IR receiver apparatus of FIG. 4.

IR pulses are detected by IR sensitive photodiode 140 which generates an electrical signal 212 as shown in FIG. 6. The electrical output from the photodiode 140 includes electrical pulses corresponding to the IR pulses detected thereby. The electrical signal 212 is applied to amplification circuit 146.

Amplification circuit 146 receives and amplifies the signal for application to comparator circuit 152. The amplification circuit 146 includes three gain stages 147-149 and a buffer stage 150. Symmetrically opposed pulses are provided to comparator circuit 152 from the buffer stage 150. In other words, the stages 147-150 provide positive and negative amplified pulses 214, i.e., symmetrically opposite polarity pulses, as shown in FIG. 6 to the comparator circuit 152. As such, generally, at least in one embodiment, upon application of a detected pulse, the positive input of the comparator circuit 152 is taken higher and the negative input thereof is taken lower to provide a pulse output from the comparator circuit 152. The gain of the stages may be fixed as desired. Further, the gain of one or more stages may be adjusted on an ongoing basis to provide additional gain when distances increase between the transmitter and receiver. One will recognize that other amplification and comparison circuits may be used for detection purposes, e.g., comparison of the amplitude of a single pulse to a reference. Yet further, the resistive and capacitive values of the stages may be adjusted to provide advantageous filtering characteristics, e.g., to provide a high pass filter above 1 kHz to filter out noise associated with the environment such as fluorescent lamp noise.

As such, the comparator circuit 152 determines if IR pulses have been received and generates a stream of pulses 216 as shown in FIG. 6 representative of the detected IR pulses. In other words, this may be referred to as pulse code demodulation. This stream of pulses 216 is then applied to the pulse width converter circuit 154 which basically divides the pulses by two. In other words, the flip flop 156 is toggled by the received pulses to convert the pulse stream 216 to a pulse width modulated stream of pulses 218 as shown in FIG. 6. This stream of pulse width modulated pulses 218 is then applied to pulse width demodulation circuit 160 which generates the audio signal 222 therefrom. For example, the demodulation circuit 160 includes amplifier/filter circuit 164 to filter the received pulse width modulated stream of pulses 218 to obtain the audio signal 222. The filtering is performed by filter components 165. The filtered audio signal is then provided to amplifier 162 for amplification, and thereafter, application to speaker 170 for sound production.

The volume of the speaker 170 is controlled by volume control circuit 168. The volume control circuit 168 includes a variable resistor that can be controlled by a user in any known manner, e.g., turning of a wheel, activating a push button, or any other method of user interface with a variable resistor. Such electrical control of volume may be unnecessary and therefore, such circuitry may be removed. Further, the volume may be adjusted by adjusting a volume control of the communication apparatus with which the portable system is being used.

The missing pulse detection circuit 167 of the receiver circuitry 145 detects when comparator 152 does not receive a pulse. The circuit 167 provides a chip disable signal to amplifier 162 when a pulse is not detected. This keeps the power amplifier 162 from being turned on and any sound from the speaker is muted when a missing pulse is detected. The output from the comparator circuit 152, i.e., pulses being detected, causes transistor 161 to remain turned off. Absence of pulses allow the switch to turn on activating the mute function. In other words, the output from the comparator circuit, i.e., when pulses are detected, is rectified and filter by circuit 163 to provide a voltage to cause the transistor 161, i.e., mute switch, to remain off. Absence of pulses allow the voltage (i.e., which is holding the switch 161 off) to drop causing the switch 161 to turn on. This pulls the chip disable of the amplifier 162 high, which turns off power to the speaker 170. In other words, at least the amplification circuit 146 of the receiver circuitry 145 is always operable in idle mode when power is being supplied thereto, e.g., such as when a battery device is connected for operation of the receiver circuitry 145. Due to the techniques used herein, power drain is limited and battery life is long even with such circuitry always being in an on state.

Figure 7A:
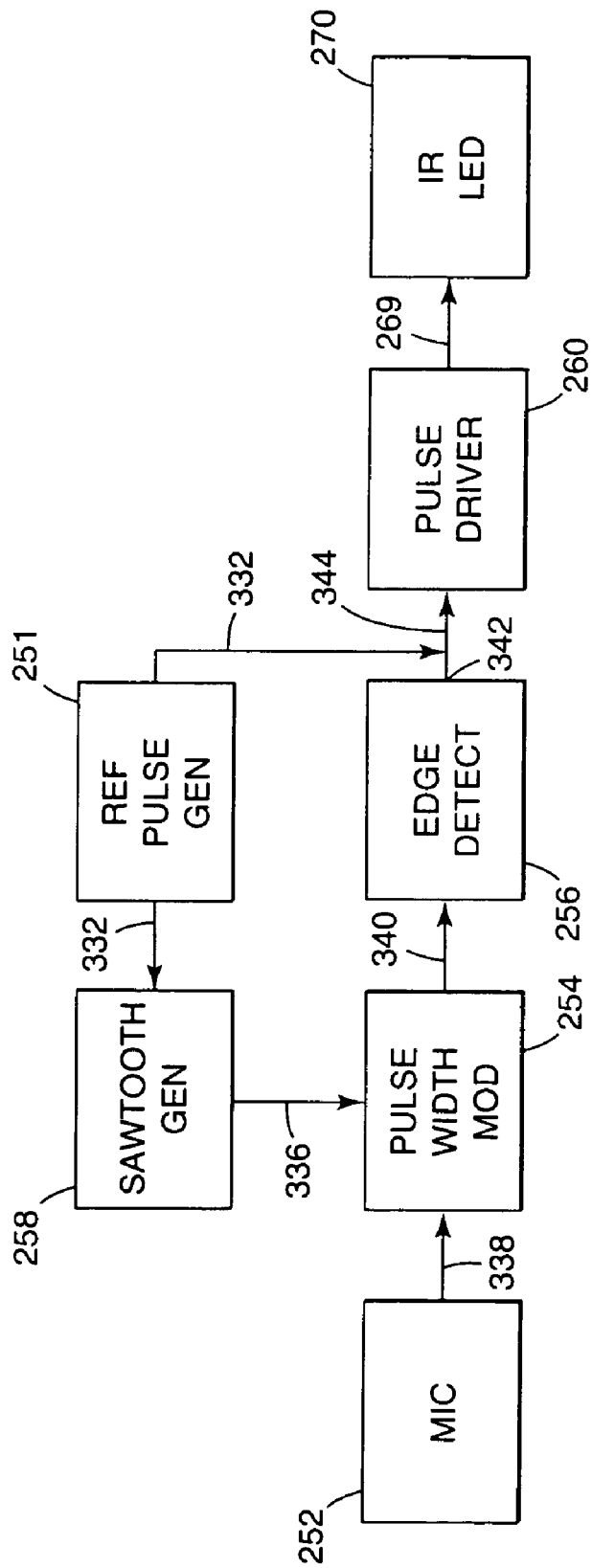
FIG. 7A is a block diagram of an alternate IR transmitter apparatus of a portable communication system shown generally in FIG. 1.
Figure 7B:
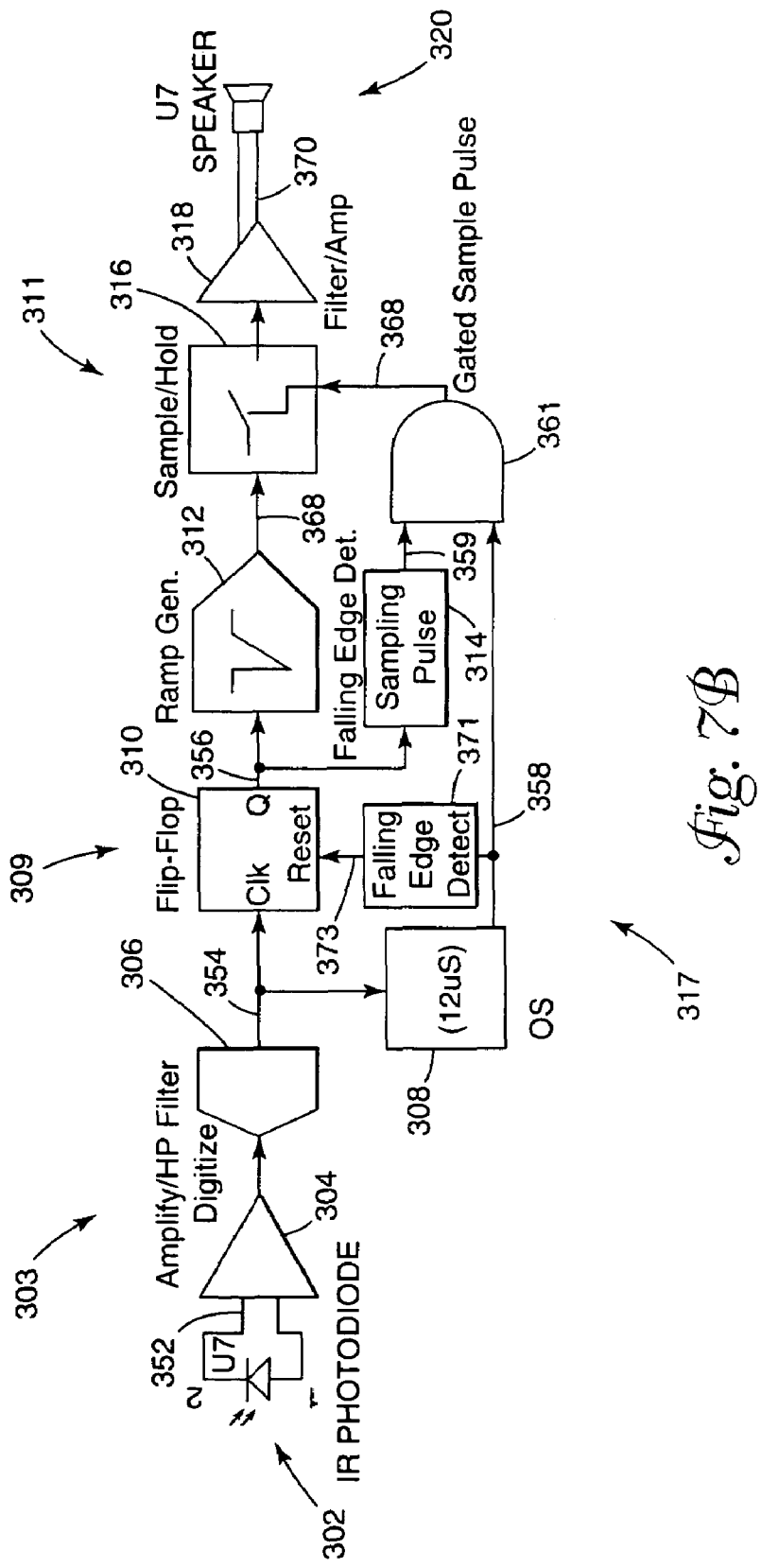
FIG. 7B is a block diagram of an alternate IR receiver apparatus of a portable communication system shown generally in FIG. 1.

FIG. 7A shows a block diagram of another illustrative embodiment of transmitter circuitry 250 of a portable communication system 10 like that described generally with reference to FIG. 1. The operation of the transmitter circuitry 250 shall be described with reference to the waveform diagram 330 of FIG. 8. FIG. 7B shows a block diagram of another illustrative embodiment of receiver circuitry 300 of a portable communication system 10 like that described generally with reference to FIG. 1 and operable with the transmitter circuitry 250 of FIG. 7A.

Figure 8:
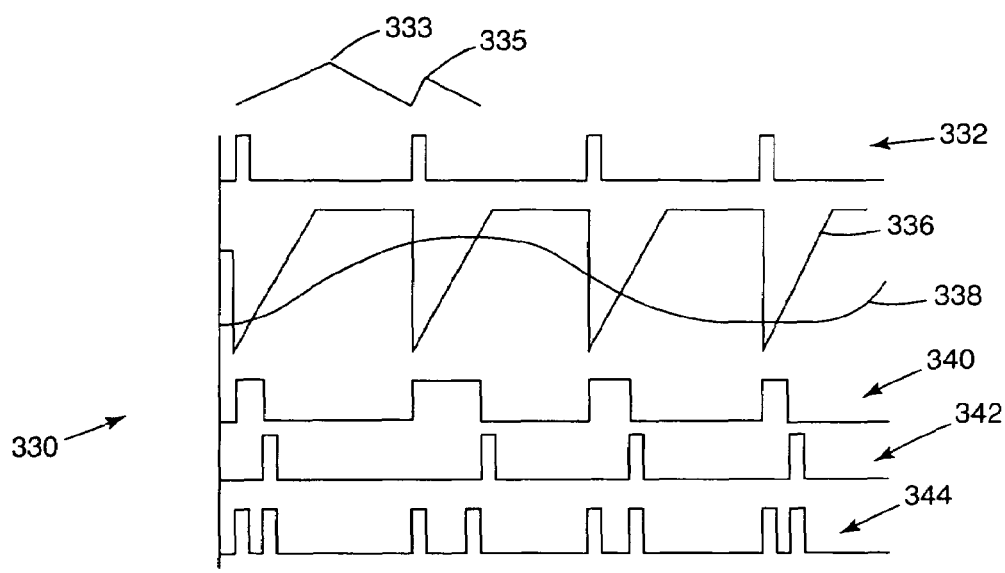
FIG. 8 is a waveform diagram used to illustrate the functions provided by the IR transmitter apparatus of FIG. 7A.

The transmitter circuitry 250 shown in FIG. 7A includes a microphone 252, a pulse width modulation circuit 254, a sawtooth generator circuit 258, a reference pulse generator circuit 251, an edge detect or edge to pulse conversion circuit 256, a pulse driver circuit 260, and a IR LED 270. The microphone 252 picks up sound input and applies an audio signal 338 as shown in FIG. 8, preferably amplified, to the pulse width modulation circuit 254, e.g., a comparator circuit. The sawtooth generator circuit 258 generates a sampling ramp signal 336 every cycle 333 as shown in FIG. 8, e.g., every 25 μseconds, based on a reference pulse signal 332 provided by pulse generator 251 at the start of every cycle. For example, the reference pulse may be a 1 μsecond constant width pulse provided every 25 μseconds.

The sampling ramp signal 336 is a sawtooth waveform much like the 50 kHz waveform described with reference to FIG. 3. However, the ramp time 335 as shown in FIG. 8 of the sampling ramp signal 336 is of shorter duration than the ramp of the previous waveform which extended during the entire cycle.

The sampling ramp waveform 336 is applied to the pulse width modulation circuit 254, e.g., a comparator circuit, along with the audio signal 338. The comparator circuit compares the audio signal 338 and the sampling ramp waveform 336, and generates an output that is a pulse width modulated waveform 340 as shown in FIG. 8. In other words, the width of the pulses vary according to the amplitude of the audio signal 338. However, the reason for using a shorter ramp duration is to make the pulse width of the pulses of pulse width modulated waveform 340 vary within a shorter time frame within the cycle time 333. For example, with a ramp duration of 10 μseconds and a 25 μseconds cycle time, the pulse width will vary between 2 μseconds and 10 μseconds. In other words, the 25 μseconds sample period has been compressed into a maximum of 10 μseconds (e.g., less than 50 percent duty cycle).

The pulse width modulated waveform 340 is applied to edge detect circuit 256 which detects the falling edge of the pulses of the pulse width modulated waveform 340 or, alternatively, both the rising and falling edges of the pulses of the pulse width modulated waveform 340. If only the falling edge is detected, the edge detect circuit 256 generates a constant width pulse stream representative of the falling edges 342 to be provided to the pulse driver 260 with the rising edge of the pulses being indicated by the stream of reference pulses 332 from reference pulse generator 251. However, preferably, both the rising and trailing edges are detected providing a stream of pulses representative thereof as shown by waveform 344 of FIG. 8. The width of the pulses generated is controlled as previously described herein. The stream of constant width pulses 344 is applied to pulse driver circuit 260. The IR LED 270 is then driven by pulses 269 from the pulse driver circuit 260 such that pulses of IR light are emitted therefrom.

Figure 9:
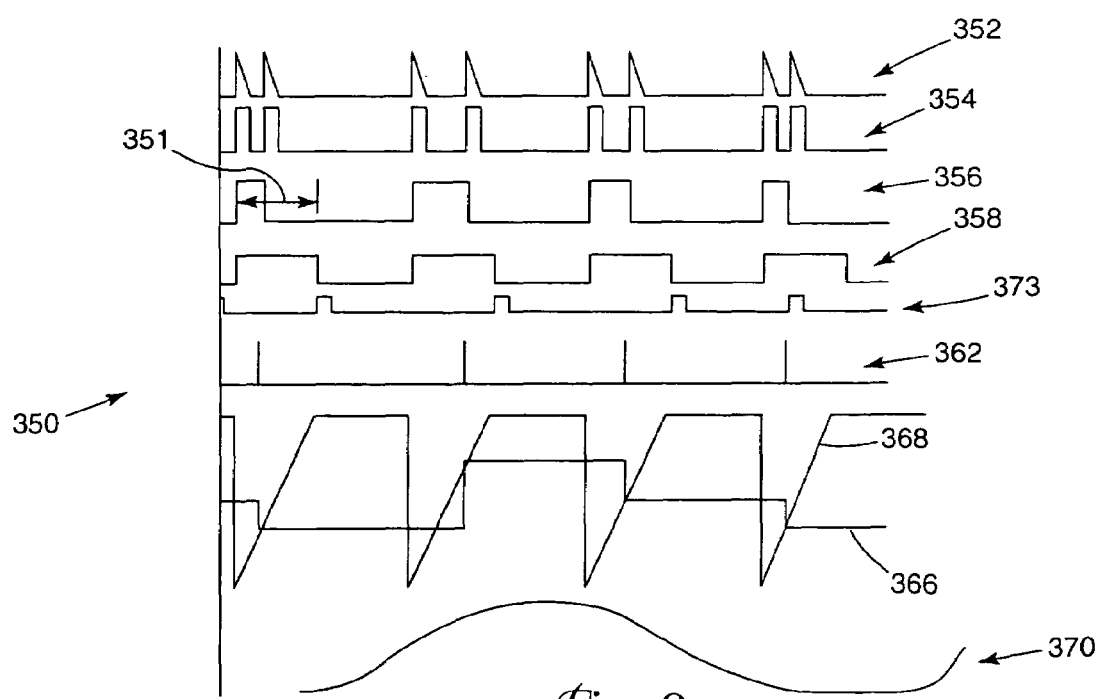
FIG. 9 is a waveform diagram used to illustrate the functions provided by the IR receiver apparatus of FIG. 7B.

The IR receiver circuit 300 shown in FIG. 7B includes an IR sensitive photodiode 302, a pulse detect circuit 303 including an amplification/high pass filter circuit 304 and digitization circuit 306, a pulse width converter circuit 309 including a flip flop 310, a one-shot circuit 308, a pulse width demodulation circuit 311, a duty cycle detection and polarity correction circuit 317, a filter/amplifier circuit 318, and speaker 320. IR pulses are detected by IR sensitive photodiode 302 which generates an electrical signal 352 including output pulses as shown in FIG. 9. The electrical output pulses from the photodiode 302 correspond to the IR pulses detected thereby. The electrical signal 352 is applied to amplification/high pass filter circuit 304 for amplification and provision to digitization circuit 306, e.g., a comparator circuit. The amplified pulses may be compared to a predetermined reference by the comparator circuit to determine if an IR pulse has been received. The comparator generates a stream of pulses 354, e.g., logic level pulses, representative of the detected IR pulses to be used in clocking the flip flop 310 of the pulse width converter circuit 309 which basically divides the pulses by two. In other words, the flip flop 310 is toggled by the received logic level pulses 354, e.g., rising edge pulses and falling edge pulses, to convert the pulse stream 354 to a pulse width modulated stream of pulses 356 as shown in FIG. 9. Also, the stream of pulses 354 are applied to the one shot circuit 308 for duty cycle detection and polarity correction purposes as described further below. The output of the flip flop 310 is rising edge detected and used to generate a reset pulse that marks the beginning of a linear ramp signal 368, as shown in FIG. 9, generated by ramp generator circuit 312 of pulse demodulation circuit 311. The output of the flip flop 310 is falling edge detected by falling edge detector 314 to generate a stream of sampling pulses 359. The rising edge pulse that causes the flip flop to change state at the rising edge of the pulse width modulated stream of pulses 356, also causes the one shot circuit 308 to start a time out period 351 running in which the trailing edge pulse that causes the state of the flip flop to change must be received before the one shot circuit 308 triggers a falling edge detector 373 to send a reset pulse to the flip flop 309, e.g., 12 μsecond when the ramp time is 10 μseconds. During the time out period 351, a high logic state is provided to the AND gate 361 by the one shot circuit 308 as shown by waveform 358 in FIG. 9. Upon occurrence of a falling edge pulse and detection of the falling edge of a pulse width modulated pulse of the stream of pulses 356 during the time out period 351, a short duration high sampling pulse 359 is provided by the falling edge detection circuit 314 of the duty cycle detection and polarity correction circuit 317 to the AND gate 361.

As high logic states are provided to the AND gate 361 from both the edge detection circuit 314 and the one shot circuit 308 when a falling edge is detected within time period 351, a gated sample pulse 362 is provided by the AND gate 361 to open a gate on a sample/hold circuit 316 that is sampling the linear ramp 368 generated by the ramp generator circuit 312. The gate closes and the ramp voltage last sampled is held until the next sample is taken. As such, the stepped waveform 366 as shown in FIG. 9 is provided from the sample/hold circuit 316. This stepped waveform 366 is then applied to the filter/amplifier circuit 318 to filter the received stepped voltage waveform 366 to obtain the audio signal 370 as shown in FIG. 9. The filtered audio signal 370 is then amplified and applied to speaker 320 for sound production.

The duty cycle detection and polarity correction circuit 317 is used to maintain polarity of the pulse width modulated stream of pulses 356. The falling edge pulse that is to used to change the state of the flip flop 310 from the state caused by leading edge pulse is expected to arrive at the flip flop 310 within the time period allowed for the modulated pulse, e.g., within 12 μseconds of the leading edge pulse that changes the state of the flip flop 310. The reset time-out period 351 as shown in FIG. 9 is set in which to detect the trailing edge pulse used to change the state of the flip flop 310. However, if the falling edge pulse is not detected, then the one-shot circuit 308 times out and triggers falling edge detector 371 to provide a reset pulse 373 as shown in FIG. 9 to the flip flop 310 to make the state of the flip flop 310 correct for the next received leading edge pulse. In other words, the one shot circuit 308 changes the logic state provided to the AND gate 361, e.g., it goes low, as shown in waveform 358 of FIG. 9, which triggers the falling edge detector 371. Although the falling edge due to the reset pulse is detected by the falling edge detection circuit 314 and a short high pulse is provided to the AND gate 361, with the one shot circuit input to the AND gate 361 being low, a gated sample pulse 362 is not provided to the sample and hold circuit 316. As such, the previously sampled state is maintained. In such a manner, the polarity of the pulse width modulated pulse stream 356 can be maintained. Being able to retain polarity is important because it reduces the noise caused by frequent polarity reversals due to marginal reception conditions.

This alternate embodiment described with reference to FIGS. 7-9, can be described in other general terms. For example, the transmitter is a fixed frequency (e.g., period of 25 µseconds) voltage to pulse width convertor with a less than 50% duty cycle. The receiver is a pulse width to voltage convertor that takes advantage of the maximum pulse width, e.g., 10 µseconds, for the modulated pulse together with fixed frequency to allow polarity determination. In other words, the operation can be referred to as mixed mode encoding. Analog information is provided by the pulse width modulated pulse stream, with each pulse occurring in less than half (e.g., 12 µseconds) of the cycle time (e.g., 25 µseconds). Further, one bit of digital polarity is encoded in the duty cycle (e.g., less than 50% or more than 50%) that is transmitted using the constant width pulse technique in which pulses representative of the rising and falling edges of a pulse width modulated stream of pulses are generated. The receiver detects the duty cycle and corrects the polarity of the received pulses.

Figure 10:
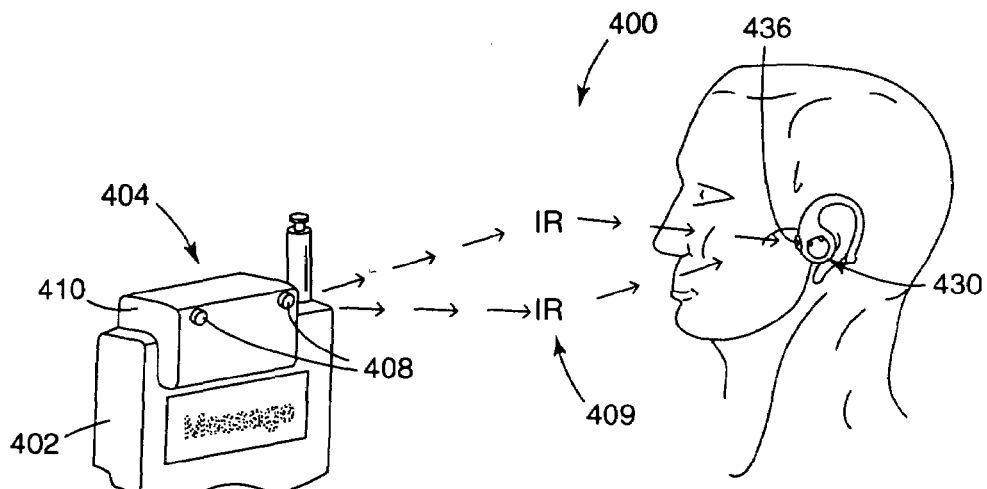
FIG. 10 is a perspective view of an IR transmitter apparatus and an IR receiver apparatus of a system as shown in FIG. 1 used with a phone apparatus.

FIG. 10 is a perspective view of an IR transmitter apparatus 404 and an IR receiver apparatus 430 of a portable IR communication system 400 which may implement one or more of the concepts described herein, e.g., modulation and demodulation circuitry. The IR transmitter apparatus 404 includes at least one infrared light emitting device 408 mounted on a transmitter housing 410 for transmission of IR signals 409 to IR receiver apparatus 430. The transmitter housing is configured to be removably coupled to the phone apparatus 402, e.g., a cellular phone, such that a microphone 407 (shown in FIG. 11) is positioned adjacent the sound output device 420 (also shown in FIG. 11) of the phone apparatus 402.

FIG. 11 is a more detailed perspective view of the IR transmitter apparatus 404 of FIG. 10 and the phone apparatus 402 to which it may be coupled. The transmitter housing 410 encloses a microphone 407 and any transmitter circuitry necessary to drive the IR light emitting devices 408, e.g., IR LEDs. Two infrared light emitting devices 408 are mounted on the transmitter housing 410, however any suitable number of LEDs may be used. The transmitter housing 410 is configured with an opening 417 sized to fit over an end 422 of phone apparatus 402. The transmitter housing 404 functions like a cap mounted, e.g., snap fitted, on the end 422 and provides microphone 407 adjacent sound output 420. The transmitter housing 410 includes cap portion 421 having opening 417 defined therein for fitting over the end of multiple types of phones. As such, the transmitter apparatus 404 is a universal apparatus that can be switched from one phone to another. The cap portion 421 also includes a battery pod or compartment 416 defined therein to hold a power source. Extending from the preferably rectangular cap portion 421 is a microphone housing portion 423 that houses the microphone 407. The microphone housing portion 423 is preferably orthogonal to the cap portion 421. Preferably, the transmitter housing 410 holds the microphone 407 adjacent the sound output 420 in a stable position, e.g., without significant movement being allowed that may cause quality problems. Some movement may be tolerated.

Various dampening structures 412, e.g., pads, are provided for housing isolation between the phone apparatus 402 and transmitter housing 410. Further, acoustic dampening material 414 is provided relative to the microphone 407 to provide housing isolation and prevent external noise from reaching the microphone 407. For example, in FIG. 11, a ring of acoustic dampening material 414 is provided about the microphone 407.

Another illustrative embodiment of a transmitter housing 472 of a transmitter apparatus 470 is shown in FIG. 13. The transmitter housing 472 has IR LEDs 474 mounted thereon. In this embodiment, the transmitter housing 472 includes a band element 476, e.g. two portions that fasten together, that can wrap around a perimeter of a phone apparatus such that microphone 477 of the transmitter apparatus 470 is adjacent a sound output (not shown) of a phone apparatus. The microphone 477 is surrounded by acoustic dampening material 479 in much the same manner as described with reference to FIG. 11. The band element 476 has associated therewith fastening elements 478 on one or both of the portions of band element 476. For example, the fastening elements 478 may include hook and loop fasteners, releasable adhesives, etc. Further, the band element 476 may be formed of a single elastic material to hold the transmitter apparatus 470 about the phone apparatus.

Several illustrative diagrams of receiver apparatus usable in accordance with the present invention will be described with reference to FIGS. 12A-12C and FIG. 14. Although such receiver apparatus can be used in conjunction with the transmitter apparatus described herein, various other types of IR receivers may be used with such transmitter apparatus, including IR headsets as opposed to ear supported devices.

FIG. 12A is a side view of the IR receiver apparatus 430 shown in FIG. 10. FIG. 12B is an exploded end view of the IR receiver apparatus 430 of FIG. 10 and FIG. 12C is a perspective rear view of a speaker portion of the IR receiver apparatus 430 of FIG. 12B. The IR receiver apparatus 430 includes a receiver housing 431 that is configured as a behind the ear receiver securable by the pinna of the ear. The receiver housing 431 includes a first body portion 432 that includes a behind the ear element 434 to secure the receiver housing 431 by the pinna of the ear and a speaker holding element 440 extending from the behind the ear element 434. Preferably, the behind the ear element 434 is of a curved nature to comfortably wrap around the pinna of the ear with at least one IR sensitive photodiode 436 positioned at a surface of the behind the ear element 434. Preferably, the IR sensitive photodiode 436 is located such that it is facing the same direction as the user's face when receiver apparatus 430 is secured by the pinna of the ear.

The speaker holding element 440 has an opening 456 defined therethrough along axis 458. Preferably, the opening 456 is of an oblong or circular cross-sectional shape, but any shape or size may be used. The opening 456 has an inner surface 457 that includes speaker contacts 452 mounted therein.

The receiver housing 431 further includes a second body portion 438 encompassing at least the speaker of the receiver apparatus 430. The second body portion 438 is sized to be retained within the opening 456. Further, the second body portion 438 includes speaker contacts 454 for mating with the speaker contacts 452 mounted in the opening 456 of the speaker holding element 440 of the first body portion 432.

The second body portion 438 preferably includes a speaker element portion 460 and a connection portion 465. Further, preferably, the speaker portion 460 that lies outside of the opening 456 when the second portion 438 is assembled with the first portion 431 has a compressible material cover 462, e.g., foam, to provide comfort to the user and adequate coupling of sound to the ear. The connection portion 465 is sized to fit in the opening 456 such that the contacts 454 at a surface of the connection portion 465 mate with the contacts 452 in the contact region 450 of the receiver housing 431. Preferably, the transmitter components other than the speaker are mounted in the first body portion 432 of the receiver housing 431. However, depending on the size of such components they could be mounted in either or both such body portions.

With the IR receiver housing 431 having a separate second body portion 438 that is removable from the opening 456, the second body portion 438 can be inserted in the opening 456 from either direction along axis 458 with mating of the contacts 454 and 452 occurring independent of the direction of insertion. As such, the receiver housing 431 can be secured to either ear of the user with the speaker element portion 460 of the second body portion 438 being next to the user's ear and the IR LED facing forward.

Figure 14:
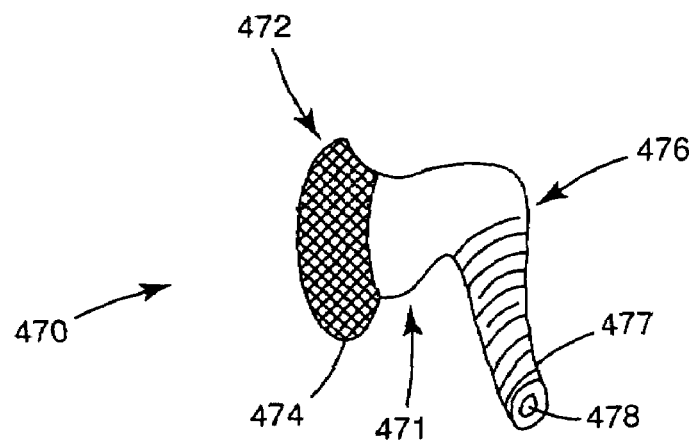
FIG. 14 is a side view of an alternate embodiment of an IR receiver apparatus, e.g., earbud.

FIG. 14 is a side view of an alternate embodiment of an IR receiver apparatus 470, e.g., earbud receiver. The receiver apparatus 470 includes a receiver housing 471 that is securable within the concha of the ear. The receiver housing 471 includes a speaker portion 472 that encloses at least the speaker and preferably, also a power source of the receiver (e.g., battery, not shown). The speaker portion 472 has a compactable/expandable material 474 (e.g., foam, sponge, etc.) about at least a portion thereof to support the receiver housing 471 in the concha of the ear. The material 474 is placed in a compacted state upon insertion in the concha of the ear. Thereafter, when released from the compacted state, the material expands to an expanded state to hold the receiver housing 471 in the concha of the ear.

The receiver housing 471 further includes an elongated portion 476 that extends from the speaker portion 472. Preferably, the elongated portion 476 generally extends in a direction orthogonal from the speaker portion 472, or at least in a non-aligned direction. The weight of the apparatus 470 is concentrated in the speaker portion 472 for stability within the concha of the ear. Further, at least a portion of the transmitter components are enclosed by the elongated portion 476 with at least one IR sensitive device 478, e.g. IR photodiode, mounted thereon. Preferably, an IR photodiode 478 is mounted towards the distal end 477 of the elongated portion 476. In such a position, the elongated portion 476 can be adjusted to "point" the photodiode in a particular direction that may assist in reception of IR signals. Further, the elongated portion 476 may be formed as a flexible portion to allow for positioning of the photodiode for reception and also for stability positioning of the apparatus in the ear.

Figure 21D:
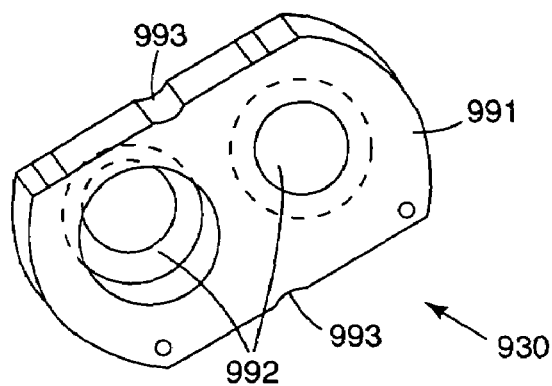
Figure 21E:
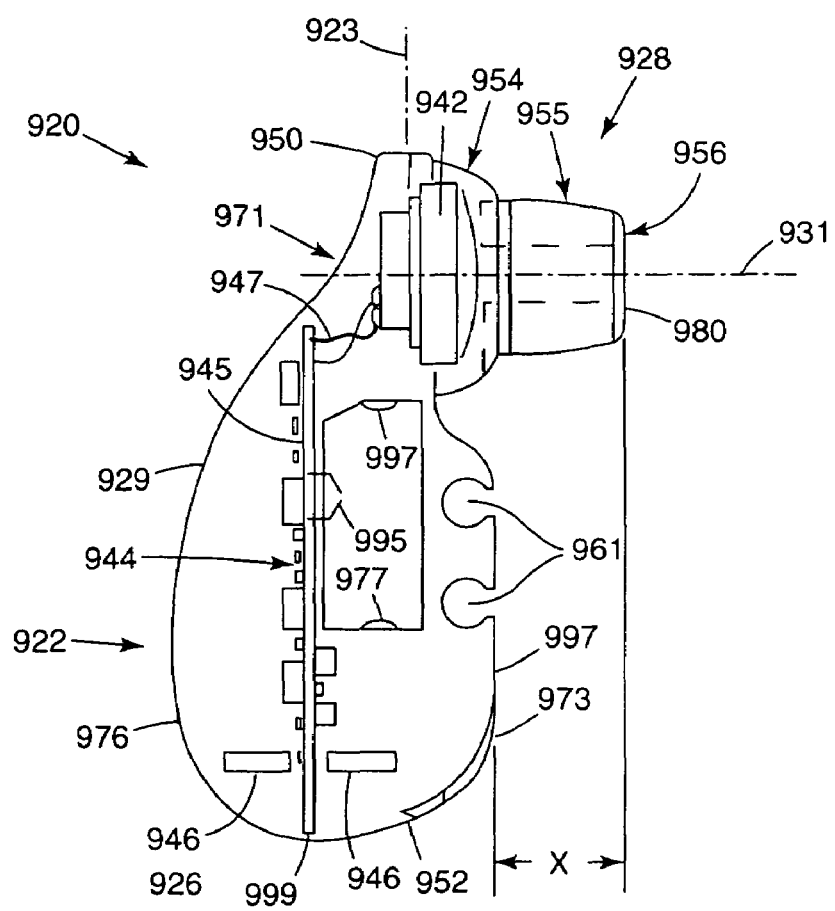

FIGS. 21A-21E show another illustrative alternate embodiment of an IR receiver apparatus 920, e.g., earbud receiver, that may be used according to the present invention. FIG. 21A is a perspective view of the receiver apparatus 920. FIG. 21B shows a side view of the receiver apparatus 920 with a battery holding portion 930 shown in FIG. 21D removed. FIG. 21C shows a plan view looking at the ear retaining portion 928 of the receiver apparatus 920. Further, FIG. 21E shows a cross-section view of the IR receiver apparatus 920.

Generally, as shown in FIGS. 21A-21E, the IR receiver apparatus 920 includes a body portion 922 for receiving a battery holding portion 930 and for providing a housing 929 for circuitry 944 (see FIG. 2E), an IR detector portion 926, and an ear retaining portion 928. The body portion 922 includes an elongated housing 929 extending from a first end 950 to a second end 952 along a body portion axis 923. The ear retaining portion 928 includes structure to support the housing 929 through retention of a least a part of the ear retaining portion 928 in the concha of the ear of a user. The ear retaining portion 928 extends from the housing 929 along an axis 931 generally orthogonal to the body portion axis 923. Preferably, the axis 931 corresponding generally to the predominate direction of sound radiating from a speaker 942 (see FIG. 21E) provided, at least in part, within an enclosure 954 of the ear retaining portion 928.

In one embodiment, the ear retaining portion 928 includes a speaker portion 954 that encloses at least a part of the speaker 942 and extends from the housing 929 along axis 931 terminating in an ear retention structure 956, including at least an earpiece 955 (see FIG. 21E) having an opening therein for sound to flow through (e.g., a short and narrow cylindrical opening in a flexible or rubber structure, wherein the opening is configured to be covered by a compactable/expandable material as described below) and which is securable within the concha of the ear. The ear retention structure 956 may be formed of various materials suitable to provide for retention in the ear. For example, the ear retention structure 956 may include a compactable/expandable material 959 (e.g., foam, sponge, etc.) about at least a portion thereof, e.g., a portion of the earpiece 955, to provide retention of the ear retention structure 956 in the concha of the ear and provide support for positioning of the receiver apparatus 920 at the ear of a user (FIG. 21E is shown without such material 959). For example, the material 959 may be in a compacted state upon insertion in the concha of the ear. Thereafter, when released from the compacted state, the material may expand to an expanded state to hold the receiver housing 471 at the ear of the user. The material 959 may be of varied sizes to fit different sized ears of different users.

The receiver housing 929 includes a first body portion 971, e.g., a tail-like portion, at the first end 950 of the body portion 922 from which the ear retaining portion 928 extends and a second body portion 973 at the second end 952 of the body portion 922 from which the tail-like structure flows. The size of the first body portion 971 is preferably smaller than the second body portion 973 to provide for stability of the receiver apparatus 920 when retained by the ear of a user. Preferably, the second body portion 973 is much larger than the first body portion 971 so as to provide a larger view or receiving angle for the IR signals by the IR detector portion 926.

Preferably, the volume occupied by the body portion 922 of the receiver apparatus 920 (with the battery holding portion 930 positioned therein) is less than 13 cm$^3$, and more preferably less than 10 cm$^3$. For example, in one configuration, the body 922 has measurements of about 4.5 cm×2 cm×3 cm=27 cm$^3$. It will be recognized that in view of the tapering and design of the body portion, the actual volume occupied by this exemplary dimensioned body portion 922 is much less than 13 cm$^3$. The miniaturization of the body portion 922 of the receiver apparatus 920 is critical to the functioning of the apparatus at least when only the concha of the ear is used to retain the receiver apparatus 920 at a user's ear. The size facilitates easy placement of the receiver apparatus 920 at the ear with reduced chance of release from the ear.

The body portion 922 includes housing 929 through which an opening 936 is defined for receipt of the removable battery holding portion 930; one embodiment of which is shown in FIG. 21D. The housing 929 is sized for mounting of circuitry 944 therein. Generally, the housing 929 includes a curved outer surface 976 to accommodate the mounting of the circuitry 944, two side surfaces 978 accommodating easy insertion of the battery holding portion 930, and an inner surface 977 at the same side of the receiver apparatus 920 as the ear retaining portion 928. The inner surface 977 is generally flatter than the curved outer surface 976, and preferably is a planar surface. The inner surface 977 which would be adjacent the head of a user when the ear retaining portion 928 is inserted in the concha of the ear is offset a distance "x" as shown in FIGS. 21B and 21E from the terminating surface 980 of the ear retaining portion 928. In other words, the inner surface 977 is generally flat and closer to the axis 923 than the terminating surface 980. This configuration also provides for stability and allows for placement of the receiver apparatus 920 at a reduced distance between the body portion 922 and the head of a user.

The opening 936 in the housing 929 is defined in the body portion 922 and configured with retaining structure 997 to receive and hold the battery holding portion 930. When retained in the opening 936 contact is provided between electrical contacts of the batteries in the battery holding portion 930 and contact elements 995 within the body portion 922 to provide power to the circuitry 944, e.g., receiver circuitry, mounted in the body portion 922. For example, the retaining structure 997 may be mating structure such as clips, bumps, or any other types of retaining structure that can be used to hold the battery holding portion 930 securely in the body portion 922 as a user moves about.

The battery holding portion 930 as shown in FIG. 21D includes battery compartments 992 located in a body member 991 thereof; preferably a graspable body member that provides for easy removal of the battery holding portion 930 from the opening 936 in the body portion 922. The battery compartments 992 hold batteries securely therein when the battery holding portion 930 is inserted into the opening 936 defined in the body portion 922. A retaining structure, e.g., indents 993, mate with retaining structure, e.g., bumps 997, to assist in retaining the battery holding portion 930 in the opening 936. When retained in the body portion 922, the contacts of the batteries in the battery holding portion 930 are in electrical contact with the contacts 995 that are electrically coupled to the components mounted in the receiver apparatus 920 for providing power thereto.

One of skill in the art will recognize that various battery compartment structures may be used depending upon, for example, the type of battery and power requirements. The circuitry 944, e.g., receiver circuitry, is designed as described elsewhere herein to provide low power drain. As such the battery holding portion 930 can be configured to accommodate both disposable and rechargeable types of batteries of smaller sizes, e.g., button type batteries, cylindrical alkaline batteries (AAA), etc., depending upon the battery holding device configuration. However, preferably, button type batteries are used.

The circuitry 944 positioned in the body portion 922 of the receiver apparatus 920 is coupled to one or more IR detectors 946 in the IR detector portion 926 located at the second end 952 of the body portion 922. The one or more IR detectors 946 are located so as to provide for suitable detection from either side 978 of the receiver apparatus 920. For example, the detector portion 926 extends as shown in FIG. 21C to both sides of axis 923, e.g., the detector portion may include one or more detector elements positioned so that the receiver apparatus 920 can be secured to either ear of the user and provide suitable reception. A shield 999 suitable for passage of IR therethrough is positioned over the detector elements 946.

Preferably, as shown in FIG. 21E, the opening 936 is defined, and also the printed circuit (pc) board 945 of circuitry 944 is positioned, in parallel fashion to the axis 923. The pc board 945 is connected to the speaker 942 by electrical connection 947. The plane of the pc board 945 runs parallel to and is adjacent a wall defining the opening 936. A pair of IR detector elements 946 are positioned on opposing sides of the pc board 945 in the IR detector portion 926.

Further, the housing 929 defines one or more ear hook slots 961, preferably on the inner surface 977. The ear hook slots 961 are configured to retain an ear hook 933 as shown only in FIG. 21C. The ear hook 933 is formed to provide additional support for the receiver apparatus 920 at the ear of the user when positioned over at least a part thereof. One will recognize that any other type of additional support for the receiver apparatus 920 may be used therewith. However, preferably, the receiver apparatus 920 is self-supported with the ear retaining portion 928 in the concha of the ear of the user.

Figure 15:
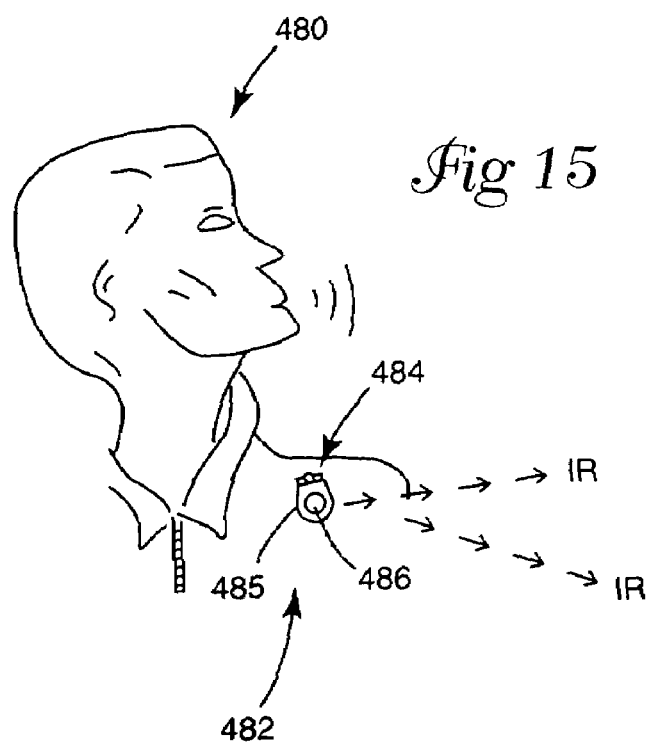
FIG. 15 is a an illustrative perspective view of a lapel IR transmitter apparatus useable with the communication system of FIG. 1.
Figure 16A:
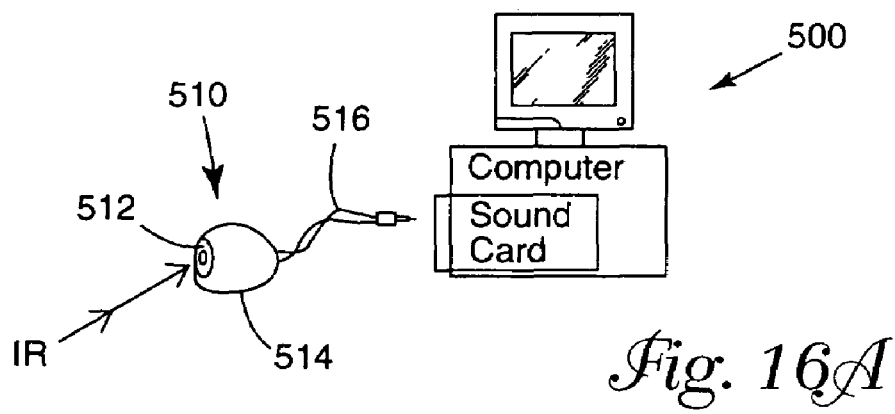
FIGS. 16A-16B are illustrations of corded IR transmitters and receivers usable with the communication system of FIG. 1.
Figure 16B:
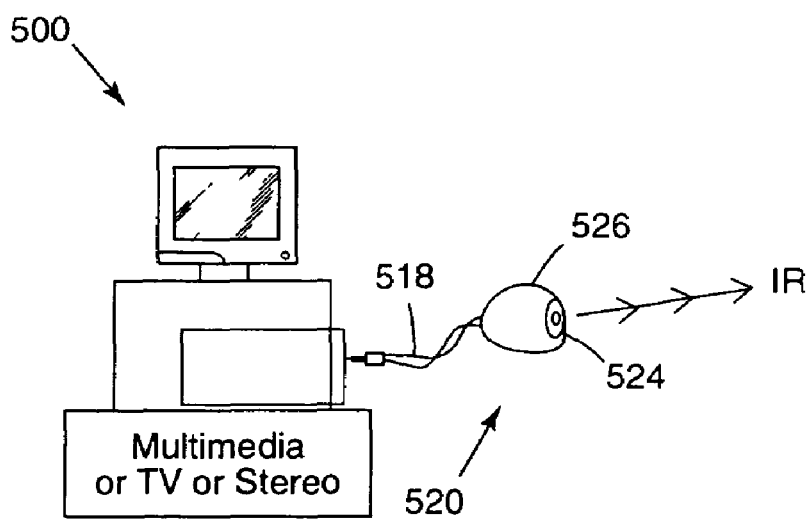

FIG. 15 is a perspective view of a lapel IR transmitter apparatus 482 and FIGS. 16A-16B are illustrations of corded IR transmitters 520 and receivers 510 usable with at least certain portions of the communication systems described herein. Such embodiments are provided to show additional components that may be used in a portable system as described herein.

For example, a user 480 may wear the lapel transmitter 482 that includes a microphone 484 for picking up sound input. The transmitter apparatus 482 may transmit using the IR light emitting device 486 driven by circuitry within housing 485. Such IR signals may be received by an IR wireless receiver apparatus such as described herein. Further, the modulation/demodulation techniques described herein may be used for communication using the lapel transmitter 482 or any other transmitter apparatus.

Further, as shown in FIG. 16A, a corded IR receiver 510 having a corded connection element 516, e.g., a jack, may be used for receiving IR signals generated according to the present invention. For example, the receiver may be connected to a computer 500 having a sound card for output of sound based on the received IR signals detected by IR sensitive diode 512 and demodulated by circuitry within housing 514.

Yet further, as shown in FIG. 16B, a corded IR transmitter 520 having a corded connection element 518, e.g., a jack, may be used for transmitting IR signals generated according to the present invention. For example, the transmitter apparatus 520 may be connected to a computer 500 having a sound output jack for providing audio signal to IR transmitter 520 for modulation by circuitry within housing 526 for transmission by IR LED 524.

One skilled in the art will recognize that various accessory items may be provided in conjunction with the present invention to provide suitable communication between the transmitter apparatus and receiver apparatus. For example, a dashboard cradle or holder may be used to place the phone apparatus having the transmitter coupled thereto in a position suitable for IR communication to be accomplished. Further phone positioning devices may include a visor clip, a window slit cradle similar to a cup holder, etc.

Preferably, according to the present invention, the ear secured housing only includes a receiver and does not include any transmitter components. With respect to use of the present invention with a phone apparatus in at least one embodiment, the microphone of the phone apparatus is believed to be able to pick up voice from a user when the phone apparatus is within a certain distance from the user. Thus, the need for additional components to relay voice to the microphone of the phone apparatus are unnecessary. However, the present invention contemplates the use of the system and methods described herein with other voice reception and transmitter equipment.

A method of using a portable communication system 10 described with reference to FIG. 1 with a phone apparatus (such as shown in FIG. 11) having a sound output device is one significant application of the system of the present invention. The method includes providing the removable transmitter apparatus 12 that includes the transmitter housing 28 enclosing at least the microphone and modulation circuitry. The removable transmitter apparatus 12 is secured to the phone apparatus such that the microphone is positioned adjacent the sound output device of the phone apparatus as previously described herein or in any other manner, e.g., cap mounting or with use of a wrap around band. Being removable, the transmitter apparatus may be detached from the phone apparatus and secured to a different phone apparatus. In such a method, the transmission technique need not be IR, but could be RF or any other suitable wireless transmission techniques.

Figure 17:
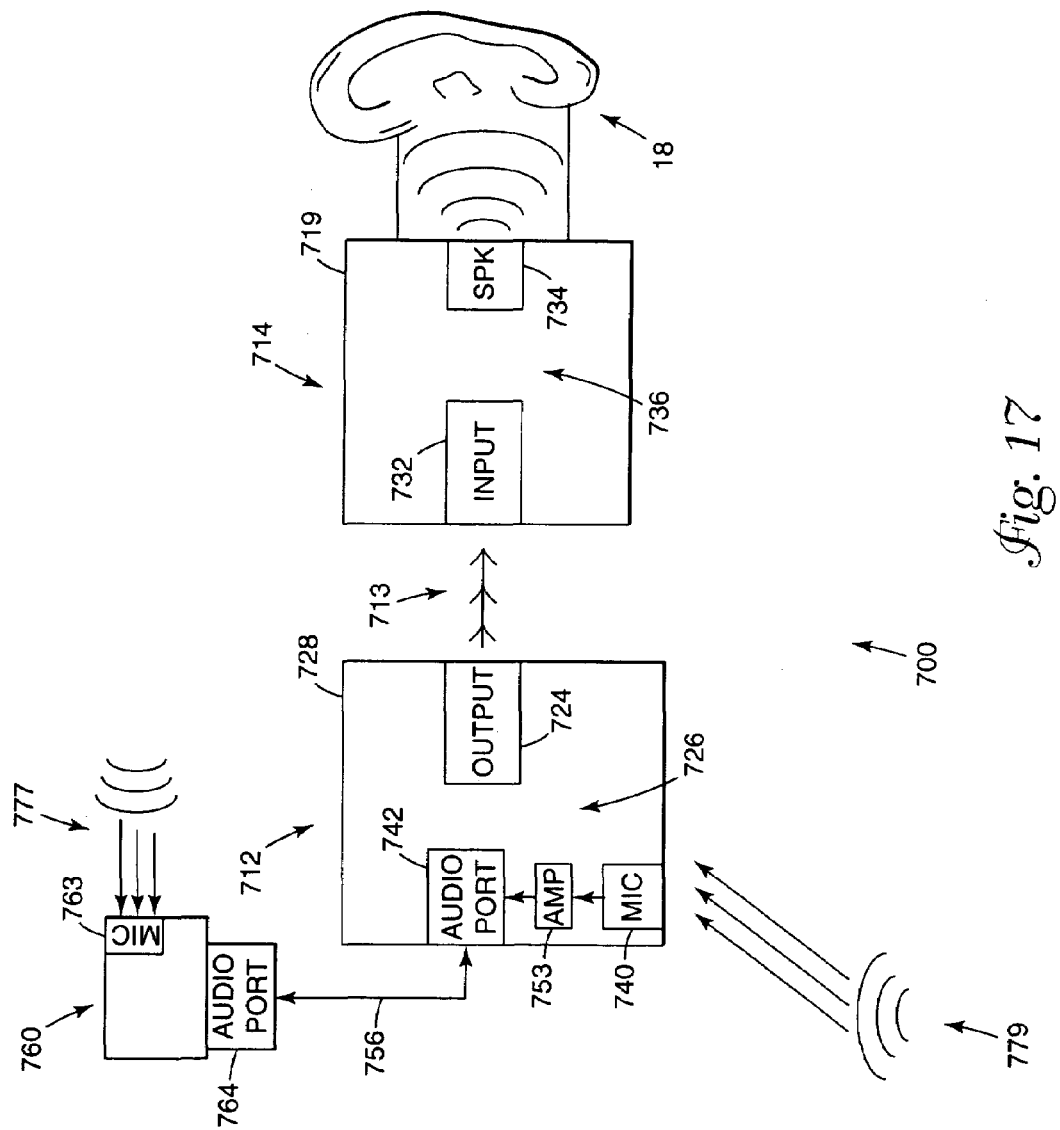
FIG. 17 is a general block diagram illustration of an alternate embodiment of a portable communication system according to the present invention.

As shown in FIG. 17, another exemplary embodiment of portable communication system 700 includes a transmitter apparatus 712 which communicates by transmission of signals 713 to portable receiver apparatus 714. The transmission link between the transmitter apparatus 712 and receiver apparatus 713 may be any communication link, such as RF, IR, etc. Preferably, however, the communication link is accomplished using the modulation and demodulation techniques described herein. For example, preferably, the signals 713 transmitted are short pulses generated and detected as described herein, whether the signals are RF or IR signals. Use of such a short pulse transmission technique has been previously described herein and is one factor in obtaining a transmitter and receiver having a miniature size as described further below and elsewhere herein. This is primarily due to the low power requirements of such techniques, and therefore, enabling the use of small power sources, e.g., button cell batteries and small alkaline batteries (e.g., AAA alkaline batteries).

Preferably, the transmitter 712 is a universal wireless IR transmitter apparatus configured to be removably coupled to a communication device 760 having an audio port 764, e.g., a cellular phone handset, and which transforms the audio signals into infrared signals 713 for transmission to the wireless IR receiver apparatus 714. It will be recognized that the present invention, or one or more portions of the invention as described herein, may be beneficially applied to various types of communication devices, e.g., telephones, MP3 players, CD or DVD players, televisions, computers, or any other apparatus having an audio input and/or output port such as a microphone and/or a speaker port, or any other electrical input and/or output device that can be electrically connected to the transmitter apparatus.

As used herein, audio port refers to any device or structure providing for input and/or output of signals to and/or from a particular apparatus. Audio port is not limited to a port that provides both input and output. Further, an audio port may include one or more components to accomplish input and/or output. For example, an audio port may include a connector element in addition to an interface component, a simple jack connected to circuitry within the apparatus, etc.

As shown in FIG. 17, the transmitter apparatus 712 includes a transmitter housing 728 in which are located a microphone 740 and modulation circuitry 726. The transmitter apparatus 712 also includes a transmitter output 724 and an audio port 742. For example, the transmitter output 724 for a wireless IR transmitter apparatus may include one or more IR emitting devices, e.g., IR light emitting diodes (LEDs), positioned on the transmitter housing 728 for emission of IR signals 713 to the receiver apparatus 714.

The audio port 742 is configured for receiving an audio signal representative of received audio input from the communication device 760. Preferably, the audio port 742 is configured for wired connection to an audio port 764 of the communication device 760. The audio port 764 may be connected to any audio signal producing device of any communication apparatus, such as a television, a computer system, a radio, a CD player, an MP3 player, a television, a stereo system, etc. The audio port 764 may be an input and/or an output port depending upon the functionality of the communication device. Likewise, audio port 742 may be either an input and/or an output port depending upon the functionally of the transmitter apparatus and the communication device 760 to which it is to be removably coupled. For example, if the transmitter apparatus 712 is to be used with an MP3 player, only an input audio port 742 may be required to provide connectivity to an audio output port 764 of the MP3 player.

Preferably, the communication device 760 is a phone apparatus such as a handset, corded or wireless. More preferably, the communication device 760 is a cellular phone. Such phone apparatus typically have an audio port that provides input and output signals, for example, to accommodate the microphone and earphone signals used by wired earphones, e.g., generally referred to as a speaker/microphone jack such as a 2.5 mm jack. One embodiment of the present invention uses the audio port of the phone apparatus to provide audio signal connection 756 between the transmitter apparatus 712 and the communication device 760, such as by a wired connection therebetween, e.g., a coiled interconnect cable and/or plug type connection elements. Although it is preferable to use an existing jack of the phone apparatus, an interface or adaptor could be configured to provide a usable audio port for connectivity between the transmitter apparatus and a phone apparatus, e.g., such as an adaptor for a tail connector of a cellular phone does not have a speaker/microphone jack.

Further, as shown in FIG. 17, when the communication device 760 is a phone apparatus, the phone apparatus generally includes a microphone 763 associated therewith. This microphone 763 is for generating audio signals from sound 777 of a user of the phone. However, according to one illustrative embodiment of the portable communication system 700 shown in FIG. 17, the microphone 763 of the phone apparatus 760 is disabled upon connection of the audio port 764 of the communication device 760 to the audio port 742 of the transmitter apparatus 712 by a corded connection.

To provide audio signals representative of sound or voice of a user when the microphone 763 of the phone apparatus 760 is disabled, the transmitter apparatus 712 includes the microphone 740 positioned for receiving sound input 779 from the user. The microphone 740 is coupled to the audio port 742 of the transmitter apparatus 712 and is operable to generate an audio signal from received sound input of the user. The audio signal generated from received sound input of the user is provided to the audio port 764 of the communication apparatus 760 via the audio port 742 of the transmitter apparatus 712.

Preferably, the microphone 740 is coupled to the audio port 742 of the transmitter apparatus 712 via an amplification circuit 753 to provide the audio signal generated by the microphone 740 with gain. This is particularly important when the communication device 760 is a cellular phone upon which the transmitter apparatus 712 is removably coupled. In such a case, in a functional setting, the phone and transmitter apparatus 712 will generally be at a distance from the user. With the provision of gain by the amplification circuit 753, a user's voice can be picked up from a greater distance and be presented clearly to the other party privy to the conversation over the cellular phone. In one embodiment, the amplification circuit 753 is single transistor. However, any amplification circuitry may be used. Preferably, a gain in the range of 2 to 20 is provided by the amplification circuit 753; more preferably, a gain in the range of 5 to 20 is used.

Figure 18A:
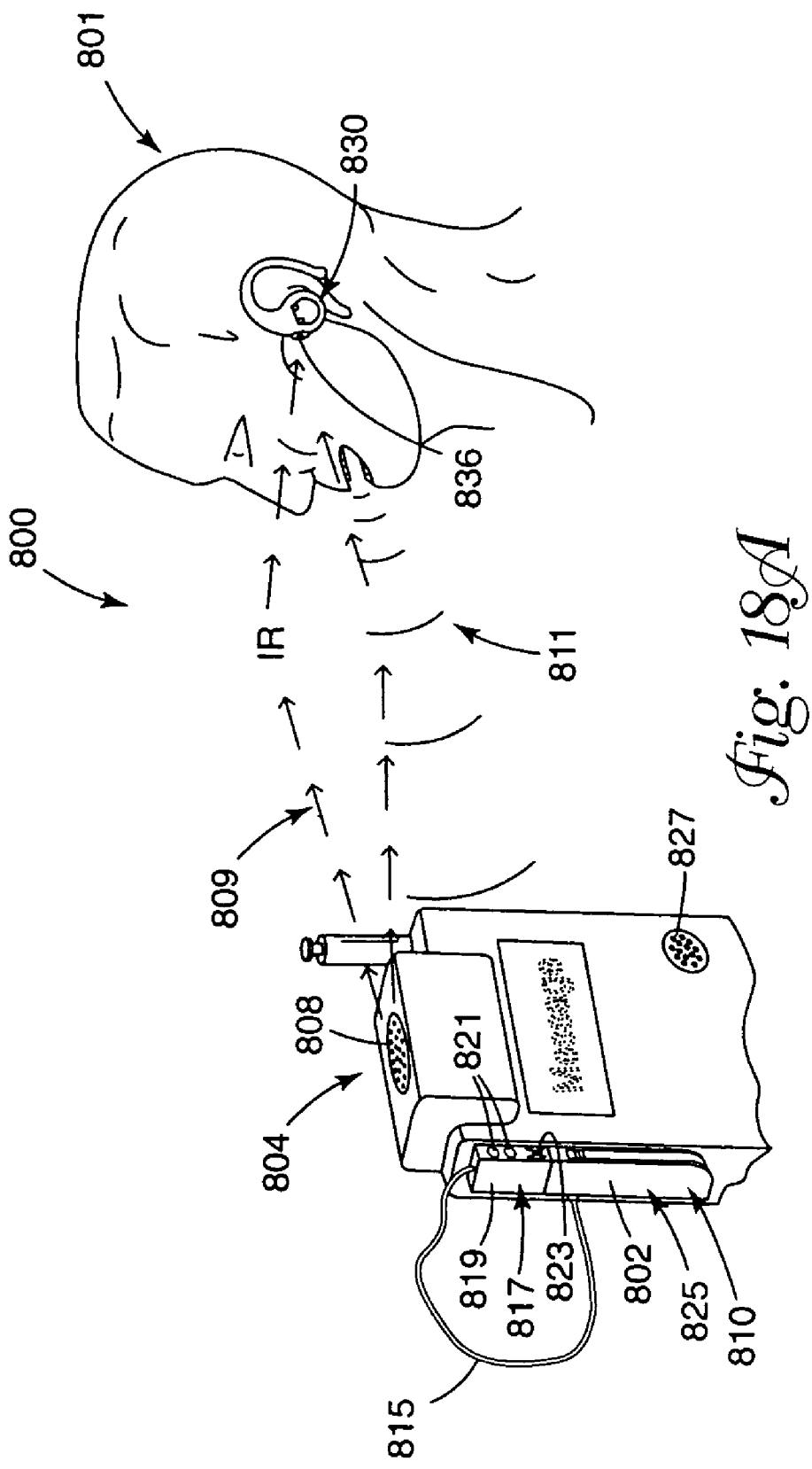
FIG. 18A is a perspective view of an exemplary embodiment of a transmitter apparatus and a receiver apparatus of a system illustrated in FIG. 17 used with a phone apparatus.
Figure 18B:
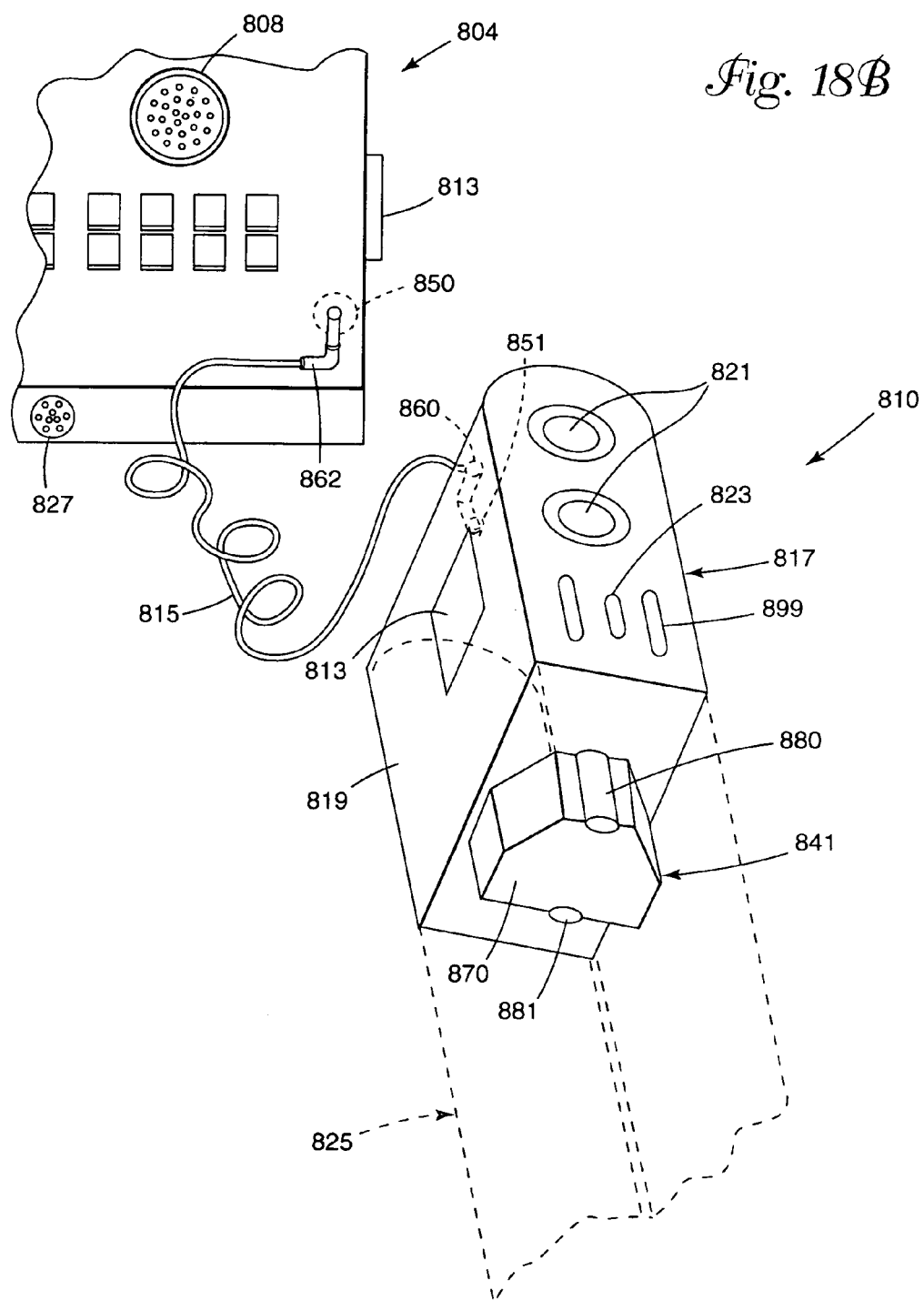
FIG. 18B is a more detailed perspective view of at least a portion of the transmitter apparatus of FIG. 18A and phone components with which it can be used.

The transmitter housing 728 is configured to be removably coupled to the communication device 760, e.g., cellular phone, as shown in the exemplary embodiment of FIGS. 18A-18B. Preferably, the microphone 740 is provided in a position to suitably receive sound input by a user. The miniaturization of the transmitter housing 728 is critical to the functioning of the apparatus at least when used with a wireless phone apparatus. The size facilitates placement of the transmitter on various surfaces of the phone apparatus. Further, such positioning of the transmitter housing 728 on the phone apparatus allows the phone apparatus to be moved easily, e.g., a user making a call in their car can then walk outside the car without interruption of the phone call. This is in contrast to a phone apparatus that is locked into a particular position to maintain functionality.

The transmitter housing 728 is preferably of a size smaller than the communication device 760 upon which it is removably coupled. For example, if the communication device 760 is a cellular phone, the transmitter housing is smaller than the cellular phone. Preferably, the volume occupied by the transmitter housing (without a battery apparatus attached) is less than 5 cm$^3$, and more preferably less than 3 cm$^3$. Further, preferably, the volume occupied by the transmitter housing with a battery apparatus attached is also smaller than the cellular phone. More preferably, the volume occupied by the transmitter housing with a battery apparatus attached is less than 12 cm$^3$, and more preferably less than 9 cm$^3$. For example, in the exemplary embodiment of the transmitter apparatus 810 shown FIGS. 19A-19H, the transmitter body component 817 is about 0.75 cm×2.5 cm×2.8 cm in size which is less than 3 cm$^3$. Further, the transmitter apparatus 810 including both the transmitter body component 817 and battery apparatus 825 when assembled is about 0.75 cm×2.5 cm×7.8 cm which is less than 9 cm$^3$.

Any manner of removably coupling the transmitter apparatus 712 to the communication device 760 may be used. For example, such coupling may be provided by a two face adhering system, e.g., adhesive, double-sided tape, or hook and loop fasteners. Any other mounting structure that allows the transmitter apparatus 712 to be removed and used on another communication device may be suitable. Compatibility of the transmitter apparatus 712 for use with multiple communication apparatus, e.g., phones, is preferred. Although removability is preferred, the transmitter apparatus 712 may be more permanently affixed to the communication device 760.

The audio signal received from the communication device 760 via the audio port 742 of the transmitter apparatus 712, is applied to the modulation circuitry 726. The modulation circuitry 726 provides a modulated signal to drive a transmitter output stage 724 for transmission of communication signals 713 for receipt by receiver apparatus 714, e.g., IR light emitting elements for transmission of IR signals. Preferably, the modulation circuitry 726 is similar to that described with reference to FIG. 1 and is operable to convert the audio signal into a stream of electrical pulses to drive the transmitting output device 724. Preferably, the audio signal is converted into a stream of constant width electrical pulses to drive the transmitting device 724 to transmit one or more corresponding constant width pulses 713, e.g., RF pulses or IR pulses depending upon the type of the communication link used. Preferably, the pulse duration is less than about 2 microseconds. More preferably, the pulse duration is less than about 1 microsecond.

The receiver apparatus 714 includes an input detection device 732 (e.g., an IR sensitive photodiode, RF detector, etc.), demodulation circuitry 736, and a speaker 734. The input detection device 732 detects the signal transmitted by transmitter apparatus 712. Preferably, the input detection device 732 detects pulses transmitted thereby. The input detection device 732 generates one or more electrical signals representative of the detected pulses. The one or more electrical signals are applied to demodulation circuitry 736. Demodulation circuitry 736 is operable to convert the one or more electric signals representative of the detected signals, e.g., pulses, to an audio signal to power the speaker to produce a sound output to be provided to the ear 18 of a user. One skilled in the art will recognize that any modulation and demodulation circuitry may be used for providing communication according to the present invention as long as they are compatible circuits, i.e., the demodulator circuitry is capable of demodulating the modulated signal. For example, several modulation and demodulation techniques are described herein with reference to FIGS. 2-9. Further, other modulation techniques can be used in certain applications.

The receiver apparatus 714 further includes a portable receiver housing 719. The receiver housing 719 encloses the speaker 734 and the demodulation circuitry 736 and may be configured substantially equivalent to those previously described herein. However, it is understood that the circuitry may be slightly different depending upon what type of communication link 713 is used, e.g., IR, RF, etc. As previously indicated herein, other forms of the receiver apparatus 714 are contemplated in accordance with the present invention and the universal transmitter 712 as described herein may be used with any wireless receiver configuration, including in the ear or behind the ear configurations as well as wireless headsets, etc.

As described previously, the portable nature of the communication systems 10 and 700 is attained at least in part through the selection of appropriate modulation and demodulation circuitry, e.g., lower power techniques are used to reduce the size of the components of the present invention (e.g., fewer and/or smaller batteries), reducing complexity of the modulation and demodulation circuitry decreases part count leading to a smaller size transmitter apparatus and receiver apparatus, etc. Size is critical to the functioning of the apparatus at least when used in some applications, e.g., a wireless phone apparatus. For example, the size facilitates placement of the transmitter apparatus on various surfaces of the phone apparatus, the positioning of the transmitter "on" the phone apparatus (as opposed to the phone apparatus being positioned on a much larger transmitter) allows the phone apparatus to be moved easily, etc.

FIG. 18A is a perspective view of an exemplary embodiment of a system 800 including a transmitter apparatus 810 and a receiver apparatus 830 used with a phone apparatus 804 which may implement one or more of the concepts described herein, e.g., modulation and demodulation circuitry, wired connection, etc. Although an RF communication link or any other type of wireless communication link may be used, preferably, the communication signals 809 are infrared pulses to provide an infrared link between the transmitter apparatus 810 and receiver apparatus 830 worn by user 801. For simplicity, the remainder of the description with reference to the system 800 shall be with use of an IR link.

The transmitter apparatus 810 includes a transmitter body component 817 and a battery apparatus 825, e.g., a power source component. The transmitter body component 817 includes at least one infrared light emitting device 821 mounted on a transmitter housing 819 for transmission of IR signals 809 to one or more IR detection elements 836 of IR receiver apparatus 830, and also includes at least one microphone 823 for receiving sound input 811 from the user 801 and generating an audio signal to be provided to the phone apparatus 804 via the wired connection 815. The transmitter housing 819 is configured to be removably coupled to phone apparatus 804, e.g., a cellular phone. The transmitter apparatus 810 is electrically connected to the phone apparatus 804 via the wired connection 815, e.g., such as through audio ports of the transmitter apparatus 810 and phone apparatus 804 (shown in FIG. 18B). The phone apparatus 804 includes a speaker 808 and a microphone 827 that are disabled upon establishment of wired connection 815.

FIG. 18B is a more detailed perspective view of the IR transmitter apparatus 810 of FIG. 18A, particularly the transmitter body component 817, and the phone apparatus 804 to which it may be coupled. The IR transmitter apparatus 810 includes the transmitter body component 817 and the battery apparatus 825. The transmitter body component 817 includes the transmitter housing 819 that encloses a microphone 823 under the microphone grid openings 899 and any transmitter circuitry (not shown for simplicity) necessary to drive the IR light emitting devices 821, e.g., IR LEDs, mounted on the transmitter housing 819. Two infrared light emitting devices 821 are mounted on the transmitter housing 819, however any suitable number of LEDs may be used. The transmitter housing 819 is configured with a contact portion 870 extending from the housing 819 and keyed for attachment to one or more matching keyed battery apparatus 825 (shown in dashed line form in FIG. 18B).

The contact portion 870 includes contact regions 880 and 881 that are configured for contact with contact regions of the battery apparatus 825 suitable to provide power to the transmitter components within the transmitter housing 819. The contact portion 870 and/or the contact regions 880-81 are configured to allow only an appropriately configured battery apparatus 825 to be attached to the transmitter body component 817. For example, as shown in FIG. 18B, the contact portion 870 is larger on one end than the other, e.g., tapered toward one end. One will recognize that with the incorporation of the keying function into the contact portion 870 that is used to make electrical contact with the battery apparatus 825, separate or additional keying elements are not needed. This saves space and manufacturing costs.

The transmitter housing 819 is removably coupled to the phone apparatus 804 by a coupling system 813, e.g., mechanical system, magnetic system, adhesive system, etc. For example, as shown in FIG. 18B, the coupling system 813 includes hook and loop components mounted on the transmitter housing 819 and a body surface of the phone apparatus 804.

The transmitter housing 819 preferably occupies a volume like that previously described herein. Further, the transmitter housing 819 includes an audio port 851, e.g., a 2.5 mm stereo jack, for receiving a plug 860 of wired connection 815. The wired connection 815 further includes a plug 862 configured to allow connection to the audio port, e.g., speaker/microphone jack, 850 of the phone apparatus 804. It will be recognized that any wired connection may be used to connect the transmitter apparatus 810 to the phone apparatus 804 and that the present invention is not limited to only those mentioned herein. For example, various types of adaptors may be used, various types of cables may be used, as well as various types of connectors.

With the transmitter apparatus 810 electrically connected to the phone apparatus 804, audio signals from the phone apparatus 804 are provided via the ports 850 and 851 to the transmitter apparatus 810. Such audio signals are then operated upon by the transmitter circuitry to provide IR signals 809 from the IR light emitting elements 821 to be received by an IR receiver. Likewise, sound input 811 from a user 801 are received at the microphone 823 of the transmitter apparatus 810. The microphone 823 generates an audio signal representative thereof and provides, preferably after appropriate amplification, the audio signal from the transmitter apparatus 810 to the phone apparatus 804 via the ports 851 and 850. One will recognize that the phone apparatus 804 may then operate on the audio signal received in such a manner using any functionality that the phone apparatus 804 is capable of providing, e.g., voice recognition properties, etc.

Figure 19A:
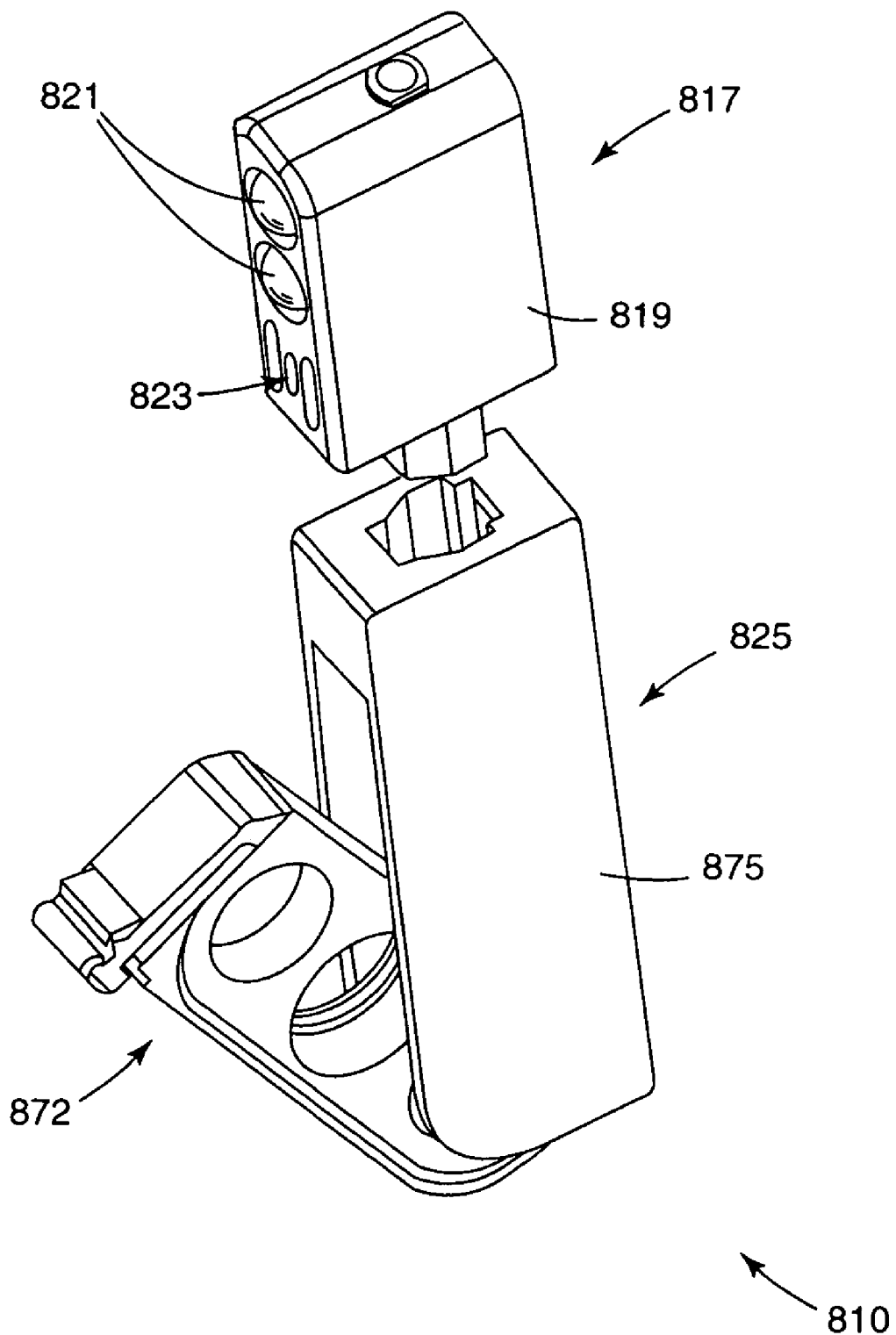

FIGS. 19A-19H are more detailed views of the exemplary embodiment of a transmitter apparatus 810 having a removable battery apparatus 825 as shown illustratively in FIGS. 18A-18B. FIG. 19A shows the transmitter apparatus 810 with a battery holding device or tray 872 in an open position ready to have batteries loaded therein. FIG. 19B shows an assembled transmitter apparatus 810 for attachment to another object such as a cellular phone. FIG. 19C shows an end view of the transmitter apparatus 810. Further, FIG. 19D shows a top view of the transmitter apparatus 810 and FIG. 19E shows a side view of the transmitter apparatus.

Figure 19F:
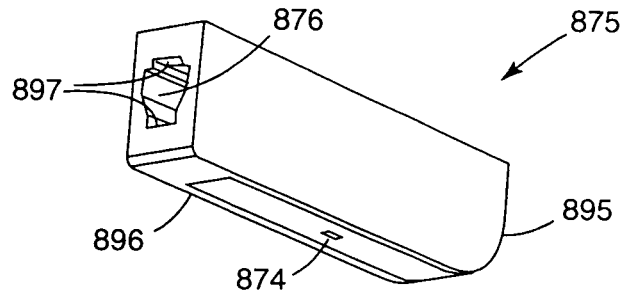
FIG. 19F shows a perspective view of the removable battery apparatus.
Figure 19G:
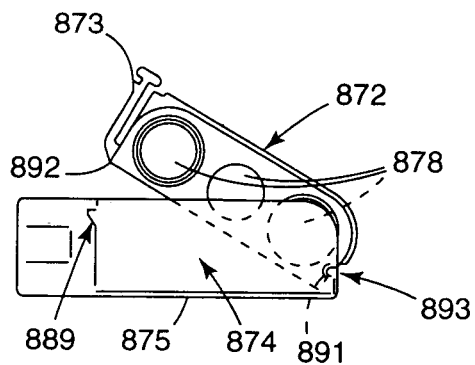
FIG. 19G shows a side view of a battery holding device positioned for coupling with the removable battery apparatus of 19F.

FIG. 19F shows a battery apparatus body component or battery pod 875 of the battery apparatus 825 configured to receive a battery holding device or tray 872 shown in FIG. 19G. The battery apparatus body component 875 of the removable battery apparatus 825 has an opening 874 defined therein for receiving the battery holding device 872 shown in FIG. 19G. As shown in FIG. 19G, the battery holding device 872 includes a first end 891 and a second end 892. The first end 891 is configured to be received at opening 874, and preferably for engagement with structure 893 at a first end 895 of the battery pod 875, e.g., a pivot/retaining cog, a hinged structure, a snap fit, etc. The second end 892 is also configured for positioning at the opening 874, and preferably for engagement with structure 889 (e.g., a catch, a latch, snap fit, a clip element, or other holding or clasping mechanism) at a second end 896 of the battery pod 875. For example, as shown in FIGS. 19A and 19E, a catch/latch type engagement structure 873 is used to lock the battery holding device in place at the second end 892.

Further, the battery apparatus body component 875 includes a mating structure 876 including electrical contacts for mating with the contact portion 870 extending from the transmitter body component 817, e.g., for providing structural stability and also to provide power to the circuitry housed in the transmitter housing 819. It is seen that the contact elements 897 of mating structure 876 are configured and sized so as to receive the keyed structure of the contact portion 870, e.g., the shaped structured. Further, the mating structure 876 with the contact elements 897 of the battery apparatus body component 875 can be used for recharging batteries if rechargeable batteries are used therein.

The battery holding device 872 includes battery compartments 878 provided to hold batteries securely therein when the battery holding device 872 is inserted into the opening 874 defined in the battery apparatus body component 870. One of skill in the art will recognize that various battery compartment structures may be used depending upon, for example, the type of battery and power requirements.

Figure 19H:
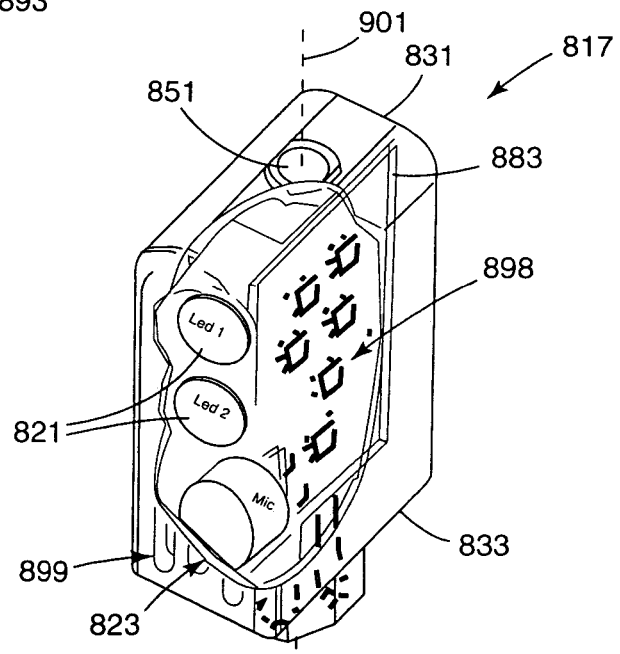
FIG. 19H shows a cut-away perspective view of the transmitter body component shown in FIG. 19A.

FIG. 19H is a cross-section view taken at the center of the transmitter body component 817. The cross-section shows the placement of the transmitter circuitry 898 which includes devices mounted on pc board 883. The pc board 883 is mounted lengthwise along axis 901 of the transmitter body component 817 which extends from a first end 831 to a second end 833. The jack 851 is located at the first end 831 and the IR light emitting devices 821 along with the microphone 823 are positioned linearly from the first end 831 to the second end 833 at the front face of the transmitter body component 817. The contact portion 870 extends from the second end 833. The light emitting devices 821 and microphone 823 may be positioned in any order along the front face. Preferably, the pc board 883 is positioned directly behind the light emitting devices 821 and the microphone 823.

The two module design of the transmitter apparatus 810 which includes the transmitter body component 817 and the removable battery apparatus 825 allows the battery apparatus 825 to be removed and a new one easily inserted therein. The transmitter apparatus 825 can accommodate both disposable and rechargeable types of batteries, e.g., button type batteries, cylindrical alkaline batteries, etc., depending upon the battery holding device configuration. In other words, various types of holding trays may be provided that are configured for acceptance into opening 874 of the battery apparatus body component 875.

Further, it will be recognized that the mating and keying structures described herein may be male-female type configurations with either of the pieces being male or female configured or any other type of mating structures, e.g., clips. For example, unlike that shown in FIGS. 18-19, the transmitter body component 817 may be configured with a female mating structure.

Figure 20:
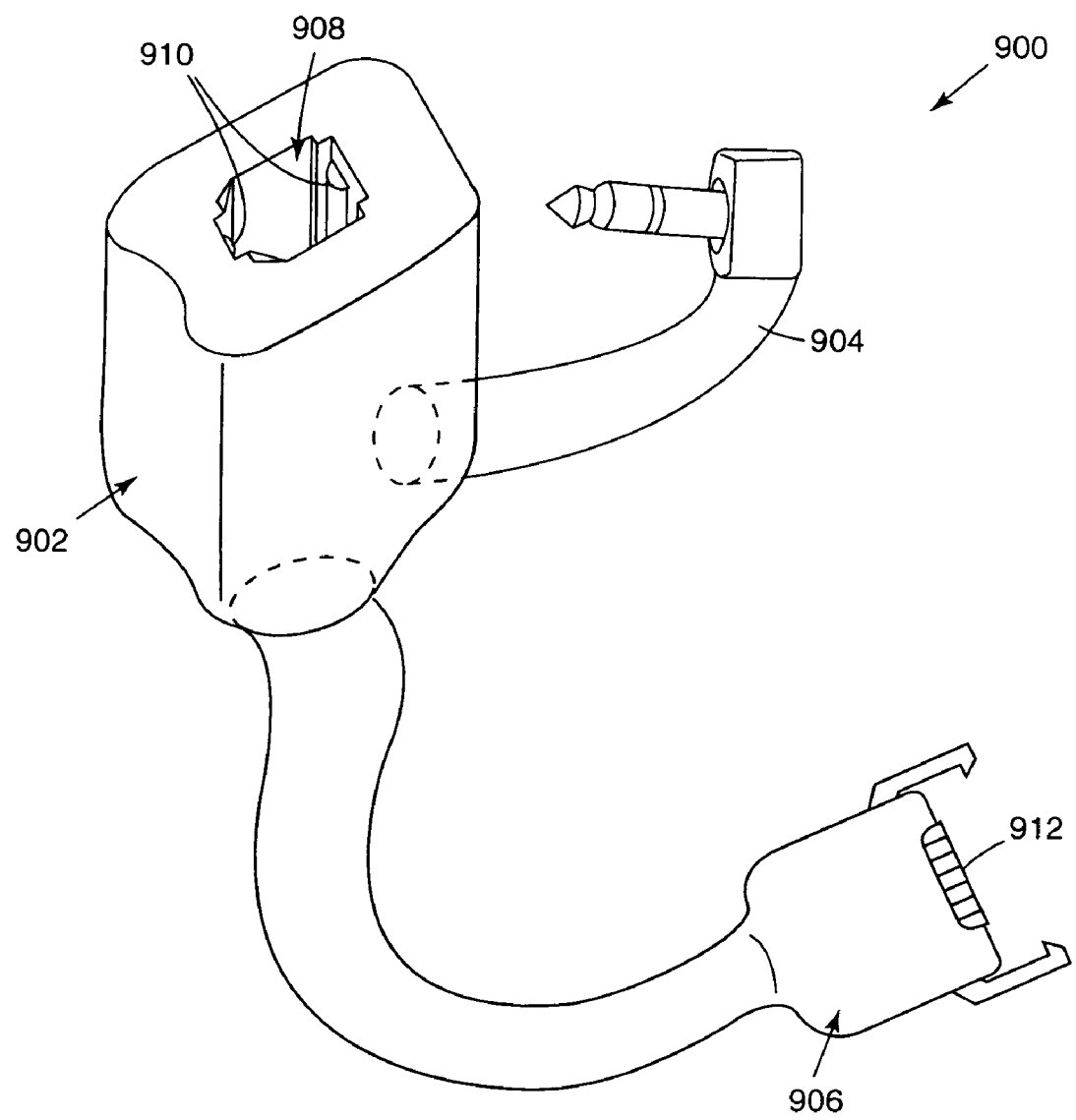
FIG. 20 shows an illustrative diagram of a battery adapter apparatus that may be used as an alternative to the battery apparatus previously shown in FIG. 19A-19G.

FIG. 20 shows an illustrative diagram of an electrical adapter apparatus 900 that may be used as an alternative to the battery apparatus previously described herein operable with the use of batteries. For example, the adapter apparatus 900 includes an adapter portion 902 configured with a mating structure 908 including electrical contacts 910 for mating with the contact portion 870 extending from the transmitter body component 817, e.g., for providing structural stability and also to provide power to the circuitry housed in the transmitter housing 819. It is seen that the contact elements 910 of mating structure 908 are configured and sized so as to receive the keyed structure of the contact portion 870, e.g., the shaped contacts and opening. The adapter apparatus 900 further includes an adapter connector 906 having contacts 912 configured for coupling with a connector structure of a device having a power source, e.g., connector structure suitable for mating with a cellular phone connector. The adapter connector 906 is electrically connected to the adapter portion 902 suitable for providing at least power from the power source of the device (e.g., battery of a cellular phone, power source of a car providing power to the cellular phone, etc.) to the transmitter body component 817 and circuitry mounted therein.

In various embodiments of the adapter apparatus 900, the adapter connector 906, e.g., a connector configured for coupling with a cellular phone or other device, may provide a mating connector for provision of power and audio input and/or output from the cellular phone. As such, the audio port of the transmitter body component 817 would be unnecessary and the input/output to and from the cellular phone would be provided by the adapter apparatus 900. Further, as shown in FIG. 20, the adapter apparatus 900, may optional include an audio input and/or output connector portion 904 similar to that shown with respect to the transmitter body component 817 to provide audio input and/or output to and/or from a cellular phone audio port, e.g., speaker/microphone jack. When the audio is provided through one or more components of the adapter apparatus 900 to the transmitter body component 817, additional electrical connection via the mating structure 908 or additional electrical wiring may be required to facilitate provision of signal from the adapter apparatus 900 to the circuitry in the transmitter body component 817.

It will be recognized that various configurations and designs may be provided for the various housings and structural components described herein. Preferably, such designs allow the invention to meet the size critical aspects associated with the present invention.

All patents and references cited herein are incorporated in their entirety as if each were incorporated separately. It is to be understood that the above description is intended to be illustrative, and not restrictive to the present invention. Many other embodiments will be apparent to those skilled in the art upon reviewing the above description. The scope of the invention should, therefore, be determined with reference to the appended claims along with the full scope of equivalents to which such claims are entitled.

What is claimed is:

1. A portable communication system for use by a user with a communication apparatus having an audio port, the system comprising:

an infrared transmitter apparatus, wherein the infrared transmitter apparatus comprises:
  at least one audio port configured to receive an audio signal representative of received audio input from the communication apparatus,
  at least one infrared light emitting device,
  modulation circuitry operable to convert the audio signal to one or more constant width electrical pulses to drive the infrared light emitting device to transmit one or more corresponding constant width infrared pulses, wherein the modulation circuitry comprises:
    pulse width modulation circuitry to convert the audio signal using a carrier signal to one or more width modulated pulses, wherein the width of the one or more pulses is varied as a function of the audio signal;
    an edge detect circuit to detect the edges of the one or more width modulated pulses and generate constant width pulses based on the detected edges; and
    a pulse driver circuit to drive the infrared light emitting device;
  a microphone coupled to the at least one audio port of the infrared transmitter apparatus and operable to generate an audio signal from received sound input of the user, wherein the audio signal generated from received sound input of the user is provided to the audio port of the communication apparatus via the audio port of the infrared transmitter apparatus, and
  a transmitter housing enclosing the modulation circuitry and the microphone and upon which the at least one infrared light emitting device is mounted, wherein the transmitter housing is of a size smaller than the communication apparatus and configured to be removably coupled onto the communication apparatus; and an infrared receiver apparatus, wherein the infrared receiver apparatus comprises:
  an infrared light detection device to detect the one or more corresponding constant width infrared pulses and generate one or more electric signals representative of the detected infrared pulses,
  a speaker,
  demodulation circuitry operable to convert the one or more electric signals representative of the detected infrared pulses to an audio signal to power the speaker to produce a sound output, and a receiver housing enclosing the speaker and the demodulation circuitry and upon which the infrared light detection device is mounted, wherein the receiver housing is formed to be self-supported by the ear of the user.

2. The system of claim 1, wherein the microphone is coupled to the at least one audio port of the infrared transmitter apparatus via an amplification circuit to provide the audio signal with a gain.

3. The system of claim 2, wherein the gain is in the range of 2 to 20.

4. The system of claim 1, wherein the transmitter housing comprises means for removably attaching the transmitter housing to the communication apparatus.

5. The system of claim 4, wherein the transmitter housing is removably coupled onto the communication apparatus by a two faced adhering system.

6. The system of claim 1, wherein the receiver housing comprises an in the ear receiver housing securable within the concha of the ear.

7. The system of claim 1, wherein the receiver housing comprises a behind the ear receiver housing securable by the pinna of the ear.

8. The system of claim 1, wherein the at least one audio port of the transmitter apparatus configured to receive an audio signal representative of received audio input from the communication apparatus comprises an audio port configured for wired connection to the audio port of the communication apparatus.

9. The system of claim 8, wherein the communication apparatus is a phone apparatus having a microphone/speaker audio port, and further wherein the audio port of the transmitter apparatus is configured for wired connection to the microphone/speaker audio port by a cord/plug connector apparatus.

10. The system of claim 1, wherein the modulation circuitry comprises voice activated power up circuitry.

11. The system of claim 1, wherein the size of the transmitter housing comprises a volume less than about 5 cm$^3$.

12. The system of claim 1, wherein the transmitter housing is configured to be removably coupled to a removable battery apparatus.

13. The system of claim 12, wherein the removable battery apparatus is configured to receive at least one of button type batteries and cylindrical alkaline batteries.

14. A portable communication system for use by a user with a communication apparatus having an audio port, the system comprising:

an infrared transmitter apparatus, wherein the infrared transmitter apparatus comprises:

at least one audio port configured to receive an audio signal representative of received audio input from the communication apparatus, at least one infrared light emitting device, modulation circuitry operable to convert the audio signal to one or more constant width electrical pulses to drive the infrared light emitting device to transmit one or more corresponding constant width infrared pulses, a microphone coupled to the at least one audio port of the infrared transmitter apparatus and operable to generate an audio signal from received sound input of the user, wherein the audio signal generated from received sound input of the user is provided to the audio port of the communication apparatus via the audio port of the infrared transmitter apparatus, and a transmitter housing enclosing the modulation circuitry and the microphone and upon which the at least one infrared light emitting device is mounted, wherein the transmitter housing is of a size smaller than the communication apparatus and configured to be removably coupled onto the communication apparatus; and an infrared receiver apparatus, wherein the infrared receiver apparatus comprises:

an infrared light detection device to detect the one or more corresponding constant width infrared pulses and generate one or more electric signals representative of the detected infrared pulses, a speaker, demodulation circuitry operable to convert the one or more electric signals representative of the detected infrared pulses to an audio signal to power the speaker to produce a sound output, wherein the demodulation circuitry comprises:

pulse detection circuitry to convert the one or more electrical signals representative of the detected infrared pulses to one or more constant width pulses based thereon;

pulse width convertor circuitry to convert the one or more constant width pulses to one or more width modulated pulses; and pulse width demodulation circuitry to convert the one or more width modulated pulses to an audio signal for application to the speaker; and a receiver housing enclosing the speaker and the demodulation circuitry and upon which the infrared light detection device is mounted, wherein the receiver housing is formed to be self-supported by the ear of the user.

15. The system of claim 14, wherein the demodulation circuitry comprises at least amplification circuitry always operable in power-on idle mode when battery devices are connected for operation of the infrared receiver apparatus.

16. The system of claim 14, wherein the microphone is coupled to the at least one audio port of the infrared transmitter apparatus via an amplification circuit to provide the audio signal with a gain.

17. The system of claim 16, wherein the gain is in the range of 2 to 20.

18. The system of claim 14, wherein the transmitter housing comprises means for removably attaching the transmitter housing to the communication apparatus.

19. The system of claim 18, wherein the transmitter housing is removably coupled onto the communication apparatus by a two faced adhering system.

20. The system of claim 14, wherein the receiver housing comprises an in the ear receiver housing securable within the concha of the ear.

21. The system of claim 14, wherein the receiver housing comprises a behind the ear receiver housing securable by the pinna of the ear.

22. The system of claim 14, wherein the at least one audio port of the transmitter apparatus configured to receive an audio signal representative of received audio input from the communication apparatus comprises an audio port configured for wired connection to the audio port of the communication apparatus.

23. The system of claim 22, wherein the communication apparatus is a phone apparatus having a microphone/speaker audio port, and further wherein the audio port of the transmitter apparatus is configured for wired connection to the microphone/speaker audio port by a cord/plug connector apparatus.

24. The system of claim 14, wherein the modulation circuitry comprises:
pulse width modulation circuitry to convert the audio signal using a carrier signal to one or more width modulated pulses, wherein the width of the one or more pulses is varied as a function of the audio signal;
an edge detect circuit to detect the edges of the one or more width modulated pulses and generate constant width pulses based on the detected edges; and
a pulse driver circuit to drive the infrared light emitting device.

25. The system of claim 24, wherein the modulation circuitry comprises voice activated power up circuitry.

26. The system of claim 14, wherein the demodulation circuitry comprises at least amplification circuitry always operable in power-on idle mode when battery devices are connected for operation of the infrared receiver apparatus.

27. The system of claim 14, wherein the size of the transmitter housing comprises a volume less than about 5 cm$^3$.

28. The system of claim 14, wherein the transmitter housing is configured to be removably coupled to a removable battery apparatus.

29. The system of claim 28, wherein the removable battery apparatus is configured to receive at least one of button type batteries and cylindrical alkaline batteries.

30. A portable transmitter apparatus for use by a user with a communication apparatus having an audio port, the apparatus comprising:
at least one audio port configured to receive an audio signal representative of received audio input from the communication apparatus;
at least one infrared light emitting device;
modulation circuitry operable to convert the audio signal to one or more constant width electrical pulses to drive the infrared light emitting device to transmit one or more corresponding constant width infrared pulses, wherein the modulation circuitry comprises:
pulse width modulation circuitry to convert the audio signal using a carrier signal to one or more width modulated pulses, wherein the width of the one or more pulses is varied as a function of the audio signal;
an edge detect circuit to detect the edges of the one or more width modulated pulses and generating constant width pulses based on the detected edges; and
a pulse driver circuit to drive the infrared light emitting device;
a microphone coupled to the at least one audio port of the transmitter apparatus and operable to generate an audio signal from received sound input of the user, wherein the audio signal generated from received sound input of the user is provided to the audio port of the communication apparatus via the audio port of the transmitter apparatus; and
a transmitter housing enclosing the modulation circuitry and the microphone and upon which the at least one infrared light emitting device is mounted, wherein the transmitter housing is of a size smaller than the communication apparatus and configured to be removably coupled onto the communication apparatus.

31. The apparatus of claim 30, wherein the microphone is coupled to the at least one audio port of the transmitter apparatus via an amplification circuit to provide the audio signal with a gain.

32. The apparatus of claim 31, wherein the gain is in the range of 2 to 20.

33. The apparatus of claim 30, wherein the transmitter housing comprises means for removably attaching the transmitter housing to a phone apparatus.

34. The apparatus of claim 33, wherein the transmitter housing is removably coupled onto the communication apparatus by a two faced adhering system.

35. The apparatus of claim 30, wherein the modulation circuitry comprises voice activated power up circuitry.

36. The apparatus of claim 30, wherein the at least one audio port of the transmitter apparatus configured to receive an audio signal representative of received audio input from the communication apparatus comprises an audio port configured for wired connection to the audio port of the communication apparatus.

37. The apparatus of claim 36, wherein the communication apparatus is a phone apparatus having a microphone/speaker audio port, and further wherein the audio port of the transmitter apparatus is configured for wired connection to the microphone/speaker audio port by a cord/plug connector apparatus.

38. The apparatus of claim 30, wherein the size of the transmitter housing comprises a volume less than about 5 cm$^3$.

39. The apparatus of claim 30, wherein the transmitter housing is configured to be removably coupled to a removable battery apparatus.

40. The apparatus of claim 39, wherein the removable battery apparatus is configured to receive at least one of button type batteries and cylindrical alkaline batteries.

41. A portable communication system for use by a user with a communication apparatus having an audio port, the system comprising:
a transmitter apparatus, wherein the transmitter apparatus comprises:
at least one audio port configured to receive an audio signal representative of received audio input from the communication apparatus via a wired connection with the audio port of the communication apparatus,
modulation circuitry operable to convert the audio signal to one or more constant width electrical pulses to drive a transmitter to transmit one or more corresponding constant width pulses, wherein the modulation circuitry comprises:
pulse width modulation circuitry to convert the audio signal using a carrier signal to one or more width modulated pulses, wherein the width of the one or more pulses is varied as a function of the audio signal;
an edge detect circuit to detect the edges of the one or more width modulated pulses and generating constant width pulses based on the detected edges; and
a pulse driver circuit to drive an RF transmitting device; and
a transmitter housing enclosing at least the modulation circuitry, wherein the transmitter housing is of a size smaller than the communication apparatus and configured to be removably coupled onto the communication apparatus; and
a receiver apparatus operable for communication with the transmitter apparatus, wherein the receiver apparatus comprises:
a detection device to detect the one or more corresponding constant width pulses and generate one or more electric signals representative of the detected pulses,
a speaker, demodulation circuitry operable to convert the one or more electric signals representative of the detected pulses to an audio signal to power the speaker to produce a sound output, and a receiver housing enclosing at least the speaker and the demodulation circuitry, wherein the receiver housing comprises an opening defined therein configured to receive a removable battery apparatus, and further wherein the receiver housing is formed to be self-supported by the ear of the user.

42. The system of claim 41, wherein the transmitter housing comprises means for removably attaching the transmitter housing to the communication apparatus.

43. The system of claim 41, wherein the receiver housing comprises an in the ear receiver housing securable within the concha of the ear.

44. The system of claim 41, wherein the receiver housing further includes a supporting ear hook extending therefrom.

45. A portable communication system for use by a user with a communication apparatus having an audio port, the system comprising:

a transmitter apparatus, wherein the transmitter apparatus comprises:

at least one audio port configured to receive an audio signal representative of received audio input from the communication apparatus via a wired connection with the audio port of the communication apparatus, modulation circuitry operable to convert the audio signal to one or more constant width electrical pulses to drive a transmitter to transmit one or more corresponding constant width pulses, and a transmitter housing enclosing at least the modulation circuitry, wherein the transmitter housing is of a size smaller than the communication apparatus and configured to be removably coupled onto the communication apparatus; and a receiver apparatus operable for communication with the transmitter apparatus, wherein the receiver apparatus comprises:

a detection device to detect the one or more corresponding constant width pulses and generate one or more electric signals representative of the detected pulses, a speaker, demodulation circuitry operable to convert the one or more electric signals representative of the detected pulses to an audio signal to power the speaker to produce a sound output, wherein the demodulation circuitry comprises:

pulse detection circuitry to convert the one or more electrical signals representative of the detected pulses to one or more constant width pulses based thereon;

pulse width convertor circuitry to convert the one or more constant width pulses to one or more width modulated pulses; and pulse width modulation circuitry to convert the one or more width modulated pulses to an audio signal for application to the speaker; and a receiver housing enclosing at least the speaker and the demodulation circuitry, wherein the receiver housing comprises an opening defined therein configured to receive a removable battery apparatus, and further wherein the receiver housing is formed to be self-supported by the ear of the user.

46. A portable transmitter apparatus for use by a user with a communication apparatus having an audio port, the apparatus comprising:

at least one audio port configured to receive an audio signal representative of received audio input from the communication apparatus;

modulation circuitry operable to convert the audio signal to one or more constant width electrical pulses to drive a transmitter to transmit one or more corresponding constant width pulses, wherein the modulation circuitry comprises:

pulse width modulation circuitry to convert the audio signal using a carrier signal to one or more width modulated pulses, wherein the width of the one or more pulses is varied as a function of the audio signal;

an edge detect circuit to detect the edges of the one or more width modulated pulses and generating constant width pulses based on the detected edges; and a pulse driver circuit to drive an RF transmitting device;

a microphone coupled to the at least one audio port of the transmitter apparatus and operable to generate an audio signal from received sound input of the user, wherein the audio signal generated from received sound input of the user is provided to the audio port of the communication apparatus via the audio port of the transmitter apparatus; and a transmitter housing enclosing at least the modulation circuitry and the microphone, wherein the transmitter housing is of a size smaller than the communication apparatus and configured to be removably coupled onto the communication apparatus.

47. The apparatus of claim 46, wherein the microphone is coupled to the at least one audio port of the transmitter apparatus via an amplification circuit to provide the audio signal with a gain.

48. The apparatus of claim 47, wherein the gain is in the range of 2 to 20.

49. The apparatus of claim 46, wherein the transmitter housing comprises means for removably attaching the transmitter housing to a phone apparatus.

50. The apparatus of claim 46, wherein modulation circuitry comprises voice activated power up circuitry.

51. The apparatus of claim 46, wherein the at least one audio port of the transmitter apparatus configured to receive an audio signal representative of received audio input from the communication apparatus comprises an audio port configured for wired connection to the audio port of the communication apparatus.

52. The apparatus of claim 51, wherein the communication apparatus is a phone apparatus having a microphone/speaker audio port, and further wherein the audio port of the transmitter apparatus is configured for wired connection to the microphone/speaker audio port by a cord/plug connector apparatus.

53. The apparatus of claim 46, wherein the size of the transmitter housing comprises a volume less than about 5 cm$^3$.

54. The apparatus of claim 46, wherein the transmitter housing is configured with an opening to receive a removable battery apparatus.

55. A portable receiver apparatus comprising:

a detection device to detect one or more pulses and generate one or more electrical signals representative of the detected pulses;

a speaker;

demodulation circuitry operable to convert the one or more electrical signals representative of the detected pulses to an audio signal to power the speaker to produce a sound output, wherein the demodulation circuitry comprises:
pulse detection circuitry to convert the one or more electrical signals representative of the detected pulses to one or more constant width pulses based thereon,
pulse width convertor circuitry to convert the one or more constant width pulses to one or more width modulated pulses, and
pulse width demodulation circuitry to convert the one or more width modulated pulses to the audio signal for application to the speaker, and
a housing enclosing at least the speaker and the demodulation circuitry, wherein the housing is formed to be self-supported by the ear of a user.

56. The apparatus of claim 55, wherein the housing comprises:
a body portion extending from a first end to a second end along a body portion axis to enclose at least a portion of the demodulation circuitry; and
an ear retaining portion enclosing the speaker, wherein the ear retaining portion extends from the first end of the body portion along an axis of predominate sound direction of the speaker that is orthogonal to the body portion axis, wherein the ear retaining portion comprises a compactable and expandable material for insertion in the concha of the ear.

57. The apparatus of claim 56, wherein the body portion comprises at least one surface that lies a certain distance from the body portion axis in the direction of extension of the ear retention portion, and further wherein the compactable and expandable material of the ear retaining portion is positioned a further distance from the body portion axis than the at least one surface of the body portion.

58. The apparatus of claim 56, wherein the detection device comprises an the infrared light detection device positioned at the second end of the body portion to detect infrared pulses and generate the electrical signals representative of such detected infrared pulses.

59. The apparatus of claim 56, wherein the body portion comprises an opening defined therein configured to receive a removable battery apparatus.

60. The apparatus of claim 59, wherein at least one of the body portion and the removable battery apparatus comprises retaining structure to secure the removable battery apparatus in the opening.

61. The apparatus of claim 56, wherein the removable battery apparatus is configured to receive one or more button type batteries.

62. The apparatus of claim 56, wherein a size of the body portion comprises a volume less than about 13 $cm^3$.

63. A portable receiver apparatus comprising:
an ear retaining portion enclosing a speaker, wherein the ear retaining portion terminates with a compactable and expandable material for insertion in the concha of an ear of a user; and
a body portion extending from a first end to a second end along a body portion axis, wherein the ear retaining portion extends from the first end of the body portion along an axis of predominate sound direction of the speaker that is orthogonal to the body portion axis, wherein an infrared light detection device is positioned at the second end of the body portion to detect infrared pulses and generate one or more electrical signals representative of such detected infrared pulses, and further wherein the body portion encloses at least demodulation circuitry operable to convert the one or more electrical signals representative of the detected infrared pulses to an audio signal to power the speaker to produce a sound output, wherein the demodulation circuitry comprises:
pulse detection circuitry to convert the one or more electrical signals representative of the detected infrared pulses to one or more constant width pulses based thereon,
pulse width convertor circuitry to convert the one or more constant width pulses to one or more width modulated pulses, and
pulse width demodulation circuitry to convert the one or more width modulated pulses to an audio signal for application to the speaker.

64. The apparatus of claim 63, wherein the body portion comprises at least one surface that lies a certain distance from the body portion axis in the direction of extension of the ear retention portion, and further wherein the compactable and expandable material of the ear retaining portion is positioned a further distance from the body portion axis than the at least one surface of the body portion.

65. The apparatus of claim 63, wherein the body portion comprises an opening defined therein configured to receive a removable battery apparatus.

66. The apparatus of claim 65, wherein at least one of the body portion and the removable battery apparatus comprises retaining structure to secure the battery apparatus in the opening.

67. The apparatus of claim 65, wherein the removable battery apparatus is configured to receive one or more button type batteries.

68. The apparatus of claim 63, wherein the size of the body portion comprises a volume less than about 13 $cm^3$.

* * * * *